US012287614B2

(12) United States Patent
Apte et al.

(10) Patent No.: US 12,287,614 B2
(45) Date of Patent: Apr. 29, 2025

(54) DIFFERENTIABLE MODEL FOR MANUFACTURABILITY

(71) Applicant: X Development LLC, Mountain View, CA (US)

(72) Inventors: Raj Apte, Palo Alto, CA (US); Cyrus Behroozi, Menlo Park, CA (US); Zhigang Pan, Austin, TX (US); Dino Ruic, Santa Clara, CA (US)

(73) Assignee: X Development LLC, Mountain View, CA (US)

( * ) Notice: Subject to any disclaimer, the term of this patent is extended or adjusted under 35 U.S.C. 154(b) by 603 days.

(21) Appl. No.: 17/665,860

(22) Filed: Feb. 7, 2022

(65) Prior Publication Data
US 2023/0251620 A1    Aug. 10, 2023

(51) Int. Cl.
*G05B 19/18*    (2006.01)
*G05B 13/02*    (2006.01)

(52) U.S. Cl.
CPC ....... *G05B 19/188* (2013.01); *G05B 13/0265* (2013.01); *G05B 2219/45031* (2013.01)

(58) Field of Classification Search
CPC .................. G05B 13/0265; G05B 2219/45031
USPC ........................................................ 700/121
See application file for complete search history.

(56) References Cited

U.S. PATENT DOCUMENTS

| 7,689,951 | B2 * | 3/2010 | Cazeaux | G06F 30/398 |
| | | | | 716/106 |
| 8,713,511 | B1 * | 4/2014 | Clark | G06F 30/30 |
| | | | | 716/136 |
| 8,869,077 | B1 * | 10/2014 | Ghaida | G06F 30/398 |
| | | | | 716/51 |
| 10,706,200 | B2 | 7/2020 | Sha et al. | |
| 10,755,026 | B1 | 8/2020 | Luo | |
| 10,838,296 | B2 * | 11/2020 | Beylkin | G03F 1/70 |
| 10,943,049 | B2 | 3/2021 | Chuang et al. | |
| 2008/0320422 | A1 * | 12/2008 | Cazeaux | G06F 30/398 |
| | | | | 716/106 |
| 2020/0320246 | A1 * | 10/2020 | Wang | G06F 30/20 |

OTHER PUBLICATIONS

Balu et al., A Deep 3D Convolutional Neural Network Based Design for Manufacturability Framework, Research Gate, arXiv:1612.02141v1, Dec. 7, 2016.

(Continued)

*Primary Examiner* — Ronald D Hartman, Jr.
(74) *Attorney, Agent, or Firm* — Botos Churchill IP Law LLP

(57) ABSTRACT

Systems, computer-implemented methods, and instructions encoded in machine-accessible storage media are provided for determining manufacturability of an integrated circuit layout. A computer-implemented method includes receiving a layout describing the integrated circuit to be manufactured by a semiconductor manufacturing process. The method also includes generating a differentiable manufacturability parameter as an output of a machine learning model using the layout, the machine learning model being trained to generate the differentiable manufacturability parameter. The differentiable manufacturability parameter describes the manufacturability of the integrated circuit by the semiconductor manufacturing process.

20 Claims, 7 Drawing Sheets

(56) References Cited

OTHER PUBLICATIONS

Francisco et al., Design Rule Checking with a CNN Based Feature Extractor, eprint arXiv:2012.11510, Dec. 21, 2020.
Francisco et al., Machine Learning for Design Rule Checking, Multilayer CMP Hotspot Detection, and PPA Modeling with Transfer Learning and Synthetic Training, North Carolina State University, 2021.
Jang et al., A Wafer Map Yield Prediction Based on Machine Learning for Productivity Enhancement.
Kim et al., Wafer Edge Yield Prediction Using a Combined Long Short-Term Memory and Feed-Forward Neural Network Model for Semiconductor Manufacturing, IEEE Access, Dec. 10, 2020.
Lin et al., Machine Learning for Yield Learning and Optimization, International Test Conference, Paper AI 3.1, 2018.
Catapult High-Level Synthesis and Verification, Siemens, Siemens Digital Industries Software Design Platform Empowering Designers, 2021.
Digital transformation: How Siemens EDA helps you engineer a smarter future faster, 2021.
Tabrizi et al., Eh Predictor: A Deep Learning Framework to Identify Detailed Routing Short Violations from a Placed Netlist, IEEE Transactions on Computer-Aided Design of Integrated Circuits and Systems, vol. 39, No. 6, Jun. 2020.
Tripathi et al., Context-Aware DFM Rule Analysis and Scoring Using Machine Learning, GlobalFoundries, 2018.

* cited by examiner

DIFFERENTIABLE MODEL FOR MANUFACTURABILITY

TECHNICAL FIELD

This disclosure relates generally to integrated circuit design, and in particular but not exclusively relates to techniques for determining manufacturability of an integrated circuit design under vendor process node design rules.

BACKGROUND INFORMATION

A contemporary integrated circuit design includes multiple physical or material layers. Each layer is represented in the design as a binary mask. The mask indicates positions where photoresist materials will be exposed during wafer fabrication. In this way, masks describe the presence or absence of a material in a semiconductor integrated circuit. Fabrication of integrated circuits typically includes multiple deposition and removal steps, each of which can be described by one or more binary masks. The overall design describes positions of conducting, semiconducting, and insulating materials deposited in semiconductor layers and can be precise on the order of nanometers. As such, fabrication errors can impair the function of the integrated circuit and can impact the yield of a fabrication process.

Each manufacturing system, referred to as a vendor process node, imposes constraints on integrated circuit designs, arising out of variability in manufacturing processes and the need for integrated circuits to reproduce with high fidelity the layouts used to direct fabrication. To be manufacturable on a given process node, a design must comply with design rules that are specific to that process node. The design rules encode the constraints imposed by the manufacturing process, for example, as logic that can be automated in software (referred to as "electronic design automation" and "design rule checking"). As such, design rules are expressed algebraically or logically, with a Boolean outcome (compliant or violating). In some cases, rules can be marked as required or recommended, giving some coarse information about whether a violation is critical to manufacturability.

Physical mechanisms underlying manufacturability constraints are not binary. In an illustrative example, an integrated circuit design can be limited by the resolution of an optical lithography process that forms nano-scale geometries of the physical integrated circuit. For a feature at or near the resolution limit, the manufacturability of the feature and the yield of the process can be described by probability distributions that are binarized to create the Boolean design rules.

Detailed manufacturability/yield data is often retained by semiconductor foundries, which usually only communicate Boolean design rules to circuit designers. Gradient based methods used for optimization are impractical without a continuous and differentiable manufacturability model to replace or complement the design rule checking software. There is a need, therefore, for machine learning-based methods to build differentiable models for semiconductor manufacturability and process yield.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
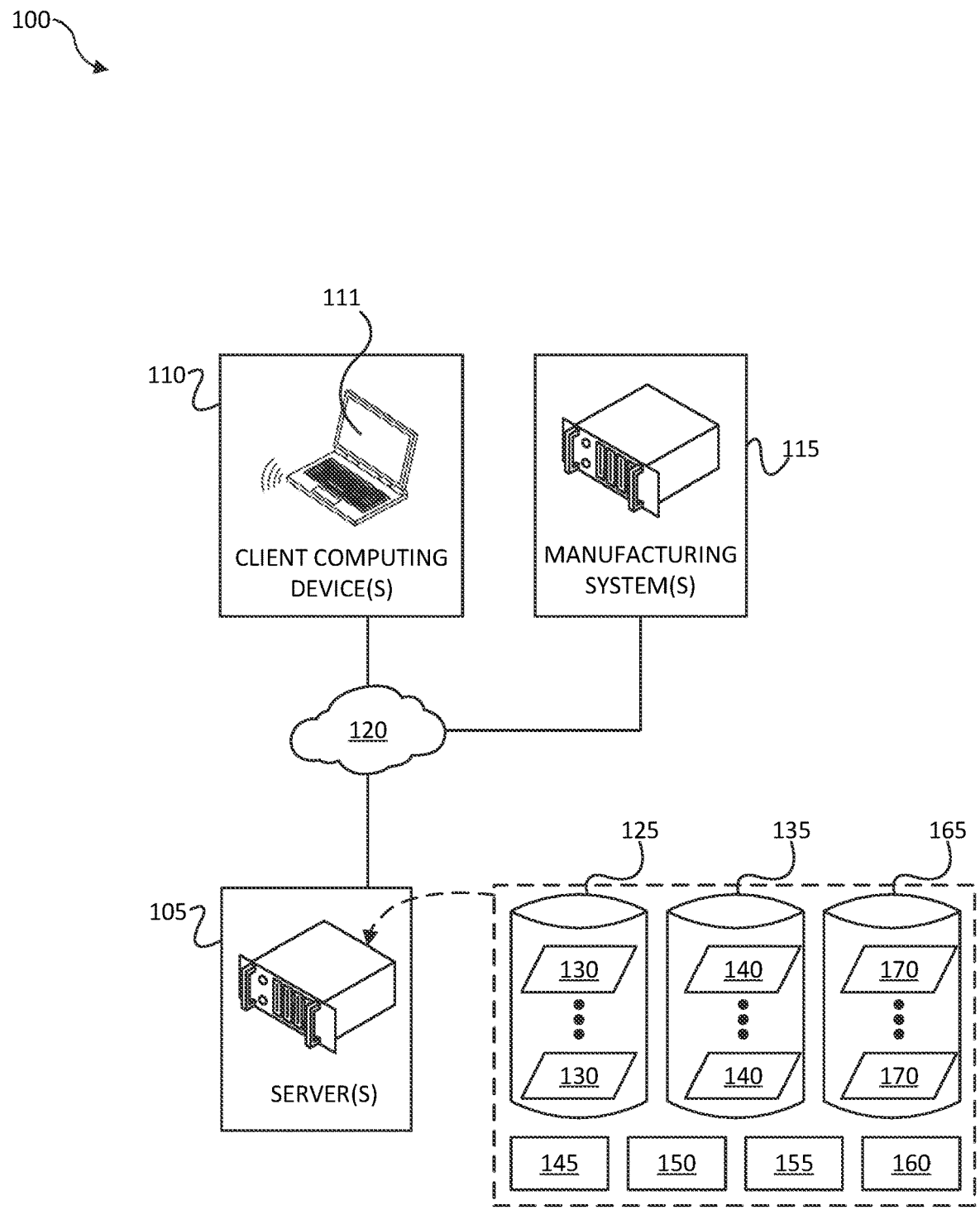
FIG. 1 is a schematic diagram of an example system for determining manufacturability of an integrated circuit layout, in accordance with embodiments of the disclosure.

Embodiments of a system and method for determining manufacturability of an integrated circuit layout using machine learning models and physics-based models are described herein. In the following description numerous specific details are set forth to provide a thorough understanding of the embodiments. One skilled in the relevant art will recognize, however, that the techniques described herein can be practiced without one or more of the specific details, or with other methods, components, models, algorithms, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

Each semiconductor manufacturing system, also referred to as a vendor process node, imposes constraints on integrated circuit designs, arising out of variability, resolution limitations, and wafer limitations in manufacturing processes and the need for integrated circuits to reproduce the layouts used to direct manufacture. To be manufacturable on a given system, a design must comply with design constraints that are specific to that system. Design rules encode the constraints imposed on the manufacturing process, for example, as logic that can be automated in software (referred to as "electronic design automation" and "design rule checking"). As such, design rules are expressed algebraically or logically, with a Boolean outcome (compliant or violating). In some cases, rules can be marked as required or recommended, giving some coarse information about whether a violation is critical.

Detailed manufacturability/yield data are often retained as proprietary by semiconductor foundries, which usually only communicate Boolean design rules to circuit designers. Physical mechanisms underlying manufacturability constraints are not binary, presenting a challenge to use the binary results of Boolean design rules to optimize designs describing physical layouts for integrated circuit masks and/or components. In an illustrative example, an integrated circuit design can be limited by the resolution of an optical lithography process that forms nano-scale geometries of the physical integrated circuit. For a feature at or near the resolution limit, the manufacturability of the feature and the yield of the process can be described by probability distributions that are binarized to create the Boolean design rules.

A differentiable manufacturability parameter, by contrast, represents a continuous and differentiable function that can be used to optimize features for manufacturability. In an illustrative example, a feature can be a spacing between two neighboring polygons in a design layout. In a Boolean context, a violation occurs when the spacing feature falls below an allowable dimension for the particular set of design rules being checked, resulting in a step-change from "true" to "false." A differentiable manufacturability parameter, however, will approach the manufacturability limit smoothly, permitting algorithms to use manufacturability as a differentiable model input for optimization of the design layout.

Characteristic dimensions of integrated circuit design features progressively shrink in scale, proceeding from the 22 nm process node in 2012, to the 14 nm process node in 2014, to the 10 nm process node in 2017, the 7 nm process node in 2018, the 5 nm process node in 2020, and further nodes, including sub-nanometer, in development. Each advancement is accompanied by added complexity, such as multi-layer designs, interlayer structures, vertical features, and dimensions approaching physical limits of system operating windows. Consequently, design rules are becoming increasingly more difficult to understand for human designers, as the number and complexity of design constraints increases.

Typical approaches to design rule checking and manufacturability of circuit designs rely on expertise of human designers coupled with collaboration with semiconductor foundries to "bend" design rules around optimization priorities. An alternative approach is presented by training machine learning models on design rules, process simulations, and/or semiconductor fabrication and/or yield data. Machine learning models, such as artificial neural networks, are well suited to systems with many inter-related parameters, but gradient based methods for optimization are unavailable without a continuous and differentiable manufacturability model to replace or complement the Boolean design rule checking. There is a need, therefore, for differentiable models for semiconductor manufacturability and process yield.

With continuous and differentiable manufacturability models, integrated circuit designers can perform holistic optimizations, including, but not limited to, optimization of power, performance, area, and manufacturability (PPAM) within design parameters or design criteria, while maintaining the manufacturability of an integrated circuit layout. Power, performance, and area are typically scalar values that are continuous and differentiable, but manufacturability is typically a Boolean value that is not continuous or differentiable.

Conventional approaches for PPAM optimization involve collaboration with semiconductor manufacturers after an initial integrated circuit layout is already designed, at least in part because semiconductor manufacturers have data collected from physical characterization of manufacturing systems that underlie the Boolean design rules. Embodiments described herein include models generating differentiable manufacturability parameters that can be prepared for different manufacturing processes, including but not limited to optical lithography, deposition and etching, or chemical mechanical polishing, which can then be combined for holistic optimization of integrated circuit layouts using PPAM techniques.

The techniques described herein can follow and/or precede additional design optimization that forms a part of integrated circuit mask design. In some cases, machine-learning methods applied to generate differentiable manufacturability parameters can be repeated during the optimization process, for example, iterating each time a number of optimization updates are completed. Manufacturability parameters for a particular layout can be correlated with yield data from a manufacturing process to improve performance of machine learning models. Machine learning methods can also be supplemented with physical and/or functional simulation to improve accuracy of manufacturability predictions.

Advantageously, the techniques described herein are built on design rule checker (DRC)-clean and/or DRC-violating layout data, and augmented/synthetic data to train machine learning manufacturability models that are continuous and differentiable. ML models are combined with physics-based simulations and, where available, yield-data from semiconductor manufacturers. In this way, information that is removed during the development of design rules (e.g., to safeguard lithography, deposition, and etch systems or to emphasize edge-placement fidelity) can be reintroduced as part of a holistic differentiable model for manufacturability. With added information, elements can be included in a layout that would otherwise violate a design rule but are within an allowable margin of manufacturability. As such, Differentiable manufacturability parameters represent an improvement in comparison to the binary classification provided from current design rule checking approaches, which return a Boolean outcome of either manufacturable or non-manufacturable. In particular, the systems and techniques improve not only physical verification of layouts and correction of layouts, but also improve early physical design stages such as placement and routing, to bridge the design and manufacturing gap and guide overall PPAM optimization. Furthermore, combined physics-based and machine learning models, in contrast to fixed-algorithm techniques, can be retrained as new training data are prepared and new process characterization models are developed. As such, the systems and methods described represent an adaptive tool that can be developed for an arbitrary semiconductor manufacturing process, for which only sparse labeled data are available, which represents a substantial improvement in performance, robustness, and computational and human resource demand of integrated circuit design and optimization. Advantageously, the techniques described herein permit integrated circuit layouts to depart from conventional design-for-manufacturability (DFM) standards, for example, by de-emphasizing edge-placement-error (EPE) as a design optimization parameter. In some embodiments, therefore, differentiable manufacturability models can improve performance of a design across multiple optimization criteria by treating manufacturability as one of a set of optimization parameters, rather than as a Boolean pass/fail validation procedure.

FIG. 1 is a schematic diagram of an example system 100 for determining manufacturability of an integrated circuit layout, in accordance with embodiments of the disclosure. Example system 100 includes: one or more servers 105, one or more client computing devices 110, one or more semiconductor manufacturing systems 115, and a network 120. The server(s) 105 include: a first database 125 of training data 130, a second database 135 of design rules 140, one or more trained machine learning models 145 and one or more untrained machine learning models 150 encoded in software 155. As part of software 155, server(s) 105 include instructions by which the models 145-150 are trained and/or deployed using computer circuitry 160. In some embodiments, server(s) 105 further include a third database 165 storing design files 170, also referred to as integrated circuit layout files, which can be stored in one or more database file formats including but not limited to GDSII or OASIS.

The following description focuses on embodiments of the present disclosure implementing a networked system for training and/or deploying machine learning models 145-150 as part of generating one or more differentiable manufacturability parameters. It is contemplated, however, that some embodiments of the present disclosure include some or all of the processes being implemented on client computing device(s) 110, such as a laptop or personal computer. For example, the training of untrained model 150 can be implemented using server(s) 105, while trained model 145 can be transferred to client computing device 110 via network 120 and can be deployed directly on client computing device 110. Similarly, the constituent elements of example system 100 can be hosted and/or stored on a distributed computing system (e.g., a cloud system) rather than in a unitary system. For example, first database 125, second database 135, third database 165, and/or computer circuitry 160 can be implemented across a distributed system, such that portions of training data 130, design rules 140, software 155, and/or design files 170 can be stored or executed by a distributed computing system in one or more physical locations.

In an illustrative example of the operation of example system 100, a user of client computing device 110 prepares a layout 210 (in reference to FIG. 2) describing an integrated circuit to be manufactured using manufacturing system 115. In a conventional system, layout 210 is examined using automated design rule checking software that can be stored and/or hosted on server 105 and/or client computing device 110. The design rule checking software generates a Boolean outcome describing whether the design is manufacturable and can also provide Boolean values for "required" or "recommended" rules. With design rule checking software, layout 210 can be readily identified as compliant or non-compliant but cannot be readily optimized.

To that end, layout 210 can be processed using machine learning models 145 and 150 stored on server(s) 105 and/or client computing device(s) 110 to generate a differentiable manufacturability parameter. In some embodiments, layout 210 is transferred to server(s) 105 via network 120, where trained machine learning models 145 process layout 210. In some embodiments, trained machine learning models 145 are implemented as part of an interactive design environment hosted on client computing devices 110 and/or server(s) 105.

Where layout 210 complies with design rules 140 corresponding to manufacturing system 115, layout 210 can be optimized, for example, based on optimization criteria provided as part of the design process. Examples of optimization criteria can include target values for power consumption, integrated circuit area, processing power, and yield on a design and/or wafer-scale, that can be application specific. For designs to be used in highly specialized, space or power constrained, or failure-intolerant applications, lower yield can be tolerated in favor of other targets. For high volume applications that are failure tolerant or not size limited, yield can be prioritized at the expense of area or processing power. Similarly, indirect quantities can be adapted for use as optimization targets. For example, a total cost of ownership of an application specific integrated circuit to be used in data center operations can be applied as an optimization function of processes that use the differentiable manufacturability parameters outputted by models 145.

Manufacturing system 115 is an example of complex systems in a pipeline between layout design and semiconductor foundries that process integrated circuit layouts and convert the design data into mask data. Mask data, in turn, is used to generate photomasks used in a photolithographic process of physical semiconductor device fabrication. In the context of example system 100, manufacturing system(s) 115 are represented by a network interface computer (e.g., a server), to simplify visual explanation. Typically, multiple processes (e.g., inverse lithography, optical proximity correction, process correction codes) are completed between "tapeout," which refers to the point at which a design rule 140 compliant design for the integrated circuit is sent to the foundry, and fabrication of a compliant integrated circuit on a wafer.

Where layout 210 violates design rules 140, however, layout 210 cannot be manufactured. In some embodiments, software 155 implements trained model(s) 145 in a way that generates one or more differentiable manufacturability parameters 225 describing layout 210. In some cases, manufacturability parameters 225 are aggregated, pooled, or otherwise processed to generate a differentiable scalar yield parameter 240 for layout 210 that is then outputted for use in optimization of layout 210. Outputting can include, but is not limited to, transfer to client computing device(s) 110 via network 120 and/or storing manufacturability parameters 225 and/or yield parameter 240 in third database 165 as design files 170. Where example system 100 operates as part of an interactive design environment, outputting manufacturability data can include generating and communicating user interface data that causes client computing device 110 to present data for manufacturability parameters on a display 111.

In some embodiments, updated design rules 140 and/or new design rules 140 are received from manufacturing system(s) 115. Semiconductor processing technology is regularly improved as new devices and techniques are developed, so it is contemplated that example system 100 will support retraining of trained models 145 and preparing new models 145-150 with changes to design rules 140 or when new design rules 140 are received.

Figure 2:
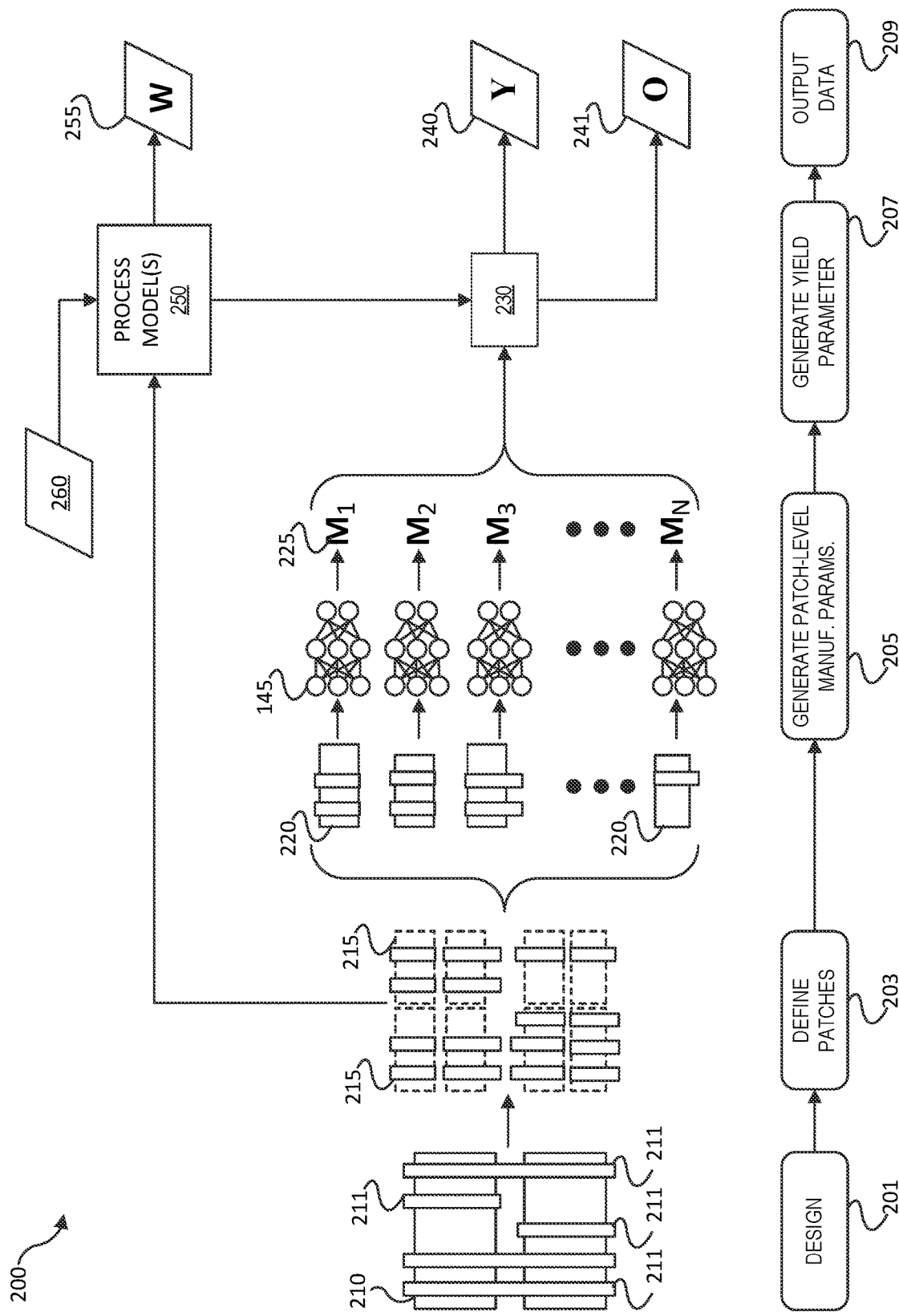
FIG. 2 is a schematic diagram illustrating an example process for generating differentiable manufacturability parameters for the integrated circuit layout, in accordance with embodiments of the disclosure.

FIG. 2 is a schematic diagram illustrating an example process 200 for generating manufacturability parameters 225 and/or yield parameter 240 of a design layout describing an integrated circuit from layout 210 using a machine learning model, in accordance with embodiments of the disclosure. Example process 200 can be implemented by one or more constituent elements of example system 100 of FIG. 1, including but not limited to server(s) 105 and/or client computing device(s) 110. Example process 200 includes operations 201-209 for accessing and/or receiving the layout 210, defining patches 215, generating one or more manufacturability parameters 225, and generating a yield parameter 240.

Example process 200 is illustrated as a series of operations 201-209 implemented by a computer system, but it is understood that one or more of the operations 201-209 can be omitted, reordered, or divided. For example, in some embodiments, operations 201-203 are implemented by client computing device(s) 110 while operations 205-209 are implemented by server(s) 105.

In some embodiments, example process 200 can be implemented as part of an interactive design environment, whereby a human user of the computer system can be presented with manufacturability data during development and optimization of layout 210. The interactive design environment can be implemented as part of a user interface, such as an application hosted on client computing device(s) 110 or server(s) 105, that can present outputs of trained models 145 on a display, a terminal, or through other electronic devices. Example process 200 can be integrated with existing design software, thereby improving the performance of software used for designing integrated circuit layouts.

At operation 201, the computer system receives and/or accesses layout 210. As illustrated, layout 210 represents an integrated circuit in terms of planar geometric shapes, referred to as polygons 211, which describe photoresist patterns corresponding to processing of metal, dielectric, or semiconductor layers that make up the material components of the physical integrated circuit. Layout 210 is a binary format file describing one or more binary masks that together define the integrated circuit layout and are validated against design rules 140 for a specific manufacturing system 115.

At operation 203, the computer system segments layout 210, defining multiple different patches 215. Each patch 215 describes a discrete portion of layout 210. Patches 215 can be defined at multiple levels of granularity, corresponding to different characteristic length scales, also referred to as window sizes. For example, fine patches can be defined at length scales at which design rules 140 address geometrical limitations of material components. In another example, coarse patches can be defined at length scales at which design rules 140 address process limitations of manufacturing steps. In this way, differentiable manufacturability parameters 225 can be prepared using multiple levels of granularity of patches 215.

Segmentation can apply different approaches to defining patches 215. In one example, patches 215 describe different physical regions of the integrated circuit represented by layout 210. In another example, patches 215 describe different physical implementations of logical functions described by layout 210 and implemented by the integrated circuit. In some embodiments, layout 210 includes repeated implementations of basic logical functions, such that a set of patches 215 are repeated multiple times in the layout. Advantageously, a manufacturability parameter 225 generated for one such patch 215 can be attributed to other identical patches 215, reducing the computational resource demand of example process 200.

In some embodiments, trained model 145 is a convolutional neural network model, trained to input an image 220 of a patch 215 and to output differentiable manufacturability parameter 225 corresponding to the patch 215. As such, example process 200 can include generating images 220 as part of operation 205, where the computer system generates patch-level manufacturability parameters. It is understood that multiple machine learning model architectures can take in an image and output a vector of numerical values, of which the convolutional neural network is an example. In some embodiments, machine learning models 145 and 150 include a transformer model, configured to receive images or image-type inputs, such as, for example, a vision transformer model. To facilitate inputting patches 215 to trained model 145, operation 205 includes generating an image 220 for each patch 215. In some embodiments, each image 220 is a binary image representing polygons 211 as "true" and background as "false."

As an alternative to image-formatted inputs, model inputs can include vectors of coordinates describing vertices and/or edges of polygons 211 reproducing mask layouts. As such, a layout can be specified as vectors containing polygon 211 coordinates. With vector-based inputs, trained models 145 can include but are not limited to encoder models, trained to generate an output vector in such a way that reflects input symmetries, for example, by being order-invariant with respect to the order of polygons 211 in the input vector. In some embodiments, trained model 145 can be or include one or more Graph Neural Networks (GNNs), convolutional neural networks, or other ML models that are configured to implement the operations described herein. In the example of a GNN, the GNN can use one edge type to connect corners of the same polygon, another edge type to encode polygons in the same layer, and a third to encode layers in the same layout. In this way, a GNN can be used to generate differentiable manufacturability parameters 225 at one or more levels of granularity of patches 215.

In some embodiments, differentiable manufacturability parameters 225 are generated by trained machine learning model 145 as vectors from an output layer of trained machine learning model 145. For example, where trained machine learning model 145 is a deep convolutional network, the model can include an input layer, an output layer, and one or more hidden layers. It would be understood by a person having ordinary skill in the art that the number of layers, the number of neurons, whether the model is fully connected, as well as other aspects of model architecture, could be modified as part of developing machine learning models 145-150. In addition, trained models 145 could incorporate hyperparameters as part of the model architecture, the tuning of which could form a part of training untrained machine learning models 150 to generate differentiable manufacturability parameters 225 according to a particular set of design rules 140.

In some embodiments, multiple differentiable manufacturability parameters 225 are generated as part of example process 200. As each patch 215 can describe different polygon 211 geometries, or layout 210 can describe a set of unique patches 215, the number of manufacturability parameters 225 can be up to and including the number of patches 215 defined at operation 203. For example, where operation 203 defines N unique patches 215 included in layout 210, where "N" is an integer, operation 205 can include generating up to N manufacturability parameters 225. In some cases, it can be beneficial to process each patch 215 defined at 203 whether or not it is unique, such that a statistical confidence can be developed for trained model 145, as part of generating yield parameter 240. For example, yield parameter 240 can be influenced by population distributions of manufacturability parameters 225, in addition to discrete and/or unique values.

To that end, operation 207 can include approaches for combination and/or selection of the individual manufacturability parameters 225 to generate yield parameter 240. For example, yield parameter 240 can incorporate each differentiable manufacturability parameter 225 or can incorporate a subset of the differentiable manufacturability parameters 225. At operation 207, multiple differentiable manufacturability parameters 225 can be pooled to generate yield parameter 240. In some embodiments, operation 207 includes multiplying the manufacturability parameters 225 to generate a layout-scale manufacturability parameter that reflects the overall yield on a layout-scale, which is identified with yield parameter 240. In this way, the yield of layout 210 can be understood to be influenced by the manufacturability of the least manufacturable patches 215. In an illustrative example, manufacturability of each patch 215 can be expressed as a number between zero and one, such that the product of the manufacturability parameters 225 can represent a probability that an integrated circuit described by the layout 210 is manufacturable (e.g., by comparing the product to a threshold value). In some embodiments, yield parameter 240 includes information for additional processes involved in semiconductor manufacturing outside of the lithography, deposition, and etching processes, such that yield parameter 240 reflects the true final yield of integrated circuits on a wafer scale. For example, process models can be included as part of a model 230 that inputs the product of the individual manufacturability parameters 225 and outputs the wafer-scale yield. Advantageously, such an approach permits optimization of layout 210 to be based at least in part on yield as an optimization criterion.

In some embodiments, operation 207 includes a fixed-algorithm approach, such as a rules-based model 230, an object model 230, or other technique to generate yield parameter 240. For example, rules-based model 230 can distinguish required design rules 140 from recommended design rules 140, such that weights or other factors can be applied to manufacturability parameters 225 as part adjusting the yield parameter 240. In some embodiments, differentiable manufacturability parameters 225 at the patch-level can be pooled to estimate or generate a higher-order manufacturability parameter on the layout-level or unit-level. For example, a number of patches 215 can together define a larger functional unit of layout 210 that can repeat multiple times in layout 210 and can be addressed by unit-level design rules 140. Advantageously, a unit-level manufacturability parameter can provide meaningful information for optimization routines that is not available from Boolean design rules 140.

As an example of optimization routines, an optimization factor 241 ("O") can be generated as a figure of merit (FoM) describing the extent to which layout 210 satisfies one or more optimization parameters including, but not limited to power, performance, area, manufacturability, yield, or combinations thereof. Additionally and/or alternatively, optimization parameters can include a reliability metric, which can be a numerical figure of merit describing a lifetime of the integrated circuit during typical operation at spec and at operating temperature. Another example optimization metric can include radiation hardness, which can be a numerical value describing radiation doses of diverse energy ranges that can be absorbed by the integrated circuit before operation is impaired. Additional and/or alternatively, optimization parameters can be based at least in part on combinations of other parameters, such as "cost per die" (combination of yield/manufacturability and area) or total-cost-of-ownership (combination of power, performance, cost per die, and reliability). In this context, "cost" can refer to an economic value such as financial cost, but also can be expressed in terms of data, resource demand, or other physical quantities. By incorporating a continuous and differentiable manufacturability parameter, optimization factor 241 can be used as part of gradient-based optimization of layout 210 that includes manufacturability by a given semiconductor manufacturing system 115 (e.g., as part of a "design for manufacturability," DFM, interactive design environment). In some embodiments, optimization factor 241 is a number centered at one, with one being defined as the value of optimization factor 241 calculated for the initial layout 210 provided by a user or as the value of optimization factor 241 for the preceding layout 210 in a multi-iteration optimization routine including multiple instances of example process 200 and multiple modifications to layout 210. Where the manufacturability predicted as part of example process 200 indicates an improvement over previous iterations, optimization factor 241 can be greater than one, while for modifications that reduce the manufacturability relative to previous iterations of layout 210, optimization factor 241 can be less than one. In an illustrative example, optimization of layout 210 with respect to manufacturability can form a part of a multi-parameter optimization with respect to area, power, or performance, or a combination thereof. In this way, a modification to layout 210 to improve manufacturability can in some cases be offset by an increase in area that can incur a penalty to optimization factor 241. Optimization of manufacturability of layout 210 can in itself involve multiple parameters, arising from the various constraints applied to polygons 211 of layout 210, as described in more detail in reference to FIG. 4.

In some embodiments, example process 200 includes one or more operations performed by one or more process models 250 configured to simulate constituent processes of semiconductor manufacturing system 115, as an approach to reintroducing physically meaningful information into manufacturability and/or yield prediction. Process model(s) 250 can be implemented as part of model 145 training, as described in more detail in reference to FIG. 3B and FIG. 6.

In some embodiments, process model(s) 250 include finite volume physical models configured to receive a map of quantized volumetric elements on the order of angstroms or nanometers, referred to as voxels, each described by a set of material properties (e.g., electronic properties, thermal properties, chemical properties, etc.). In operation, process model(s) 250 can include probabilistic, heuristic, and/or deterministic methods to simulate the interactions between substrate, mask, fill, and other CMOS materials with semiconductor processing media including but not limited to energetic photons, reactive ions, wet chemical etchants, chemical mechanical polishing reagents, or the like. Through the simulation of these interactions, a voxel can be reassigned to a new material (e.g., mask, void, fill material, polishing material, etc.) to represent a new state after the simulated process. Where processes involve probabilistic interactions, for example, for reactive ion etching or photolithography, simulation can include Monte-Carlo or other statistical methods. Similarly, processes involving mass, species, or thermal transport, such as wet-chemical etching, can include statistical, numerical, and/or deterministic methods. Processes involving vapor deposition of metal or other atoms onto a substrate surface, as is done to form thin metal films, can be simulated using molecular dynamics simulations that can be projected to the voxel map to define new layers or fill regions. In some embodiments, computationally complex processes can be approximated using process data 260 prepared as part of semiconductor manufacturing system 115 calibration.

In an illustrative example, a patch 215 can define an initial state of a semiconductor substrate (e.g., a layer of a silicon wafer) to be formed into an integrated circuit element by one or more semiconductor processes. In this example, patch 215 can define a pattern on a surface of the substrate, for which the process model(s) 250 can simulate the end state resulting from the implementation of the semiconductor manufacturing processes. In some cases, processes can include photo-lithographic etching of a pattern defined by patch 215 through a simulated mask layer, selective etching of the substrate through the patterned mask layer (e.g., by reactive ion etching processes), filling the etched regions (e.g., by plasma enhanced chemical vapor deposition "PECVD" or atomic layer deposition "ALD"), and polishing of the substrate (e.g., by chemical mechanical polishing).

Each constituent process making up the semiconductor manufacturing pipeline can be described by different physical and heuristic parameters stored as process data 260 that are collected as part of characterizations of semiconductor manufacturing system 115. Process data 260 can describe patch-scale and/or wafer-scale process characteristics that can give rise to different variations in the state of the system, such that the end state, representing the simulated structure resulting from manufacture of patch 215, can deviate from patch 215 and/or layout 210. For example, on the patch-scale, polygons 211 making up patch 215 can deviate from rectilinear patterns through the introduction of sidewall variability on the order of nanometers to tens of nanometers. Similarly, corners can deviate from right angles by including curvature on the order of nanometers to tens of nanometers. On the wafer-scale, process nonuniformity across the wafer surface can introduce deviations in the simulated end state from the layout 210 described by patches 215. As an example, for a chemical mechanical polishing process, center-to-edge removal rate issues can introduce variation in layer thickness at different positions on the surface of the wafer. Similarly, plasma nonuniformity (e.g., hot spots in plasma density) can induce variation in etch rates across the surface of a wafer that can result in variation in polygon 211 dimensions that are position dependent. As such, yield 240 of layout 210 can depend on manufacturability of layout 210 according to design rules 140 and on process data 260. While process nonuniformities can be accounted for in design rules 140, specific constraints encoded as design rules 140 can prioritize figures of merit such as edge-placement-error, aimed at reproducing layout 210 with high fidelity to the rectilinear design. In so doing, design rules 140 can enforce constraints relatively far from the physical limits of constituent processes of semiconductor manufacturing system 115.

Instead of edge-placement-error, however, retention of function can constitute an alternative figure of merit for determining manufacturability, yield 240, and/or optimization factor 241. In this context, "retention of function" describes a criterion for manufacturability that determines, based at least in part on the end state of process model(s) 250, whether patch(es) 215 as manufactured will result in a layout 210 that functions as designed to form electrical contacts between different integrated circuit elements. For example, where layout 210 describes interconnect routings between terminals of an integrated circuit, retention of function can be used to determine whether layout 210 will produce the circuit intended, or if one or more interconnects will be broken, shorted, or otherwise non-functional. Advantageously, retention of function can improve the manufacturability of layout 210 at smaller length-scales at least in part by de-prioritizing edge-placement-error and allowing curvilinear pathing in layouts 210.

Process model(s) 250 can be used for a subset of patches 215 up to and including each patch 215 segmented from layout 210 to simulate the manufactured final state of integrated circuit elements in layout 210. Where a wafer is to include multiple instances of layout 210, process model(s) 250, using process data 260 for a particular semiconductor manufacturing system 115, can generate a deviation from layout 210 and/or patch 215 as a function of position on the surface of the wafer. A map of deviation across the surface of a wafer can be used to define a process window 255 (W) across which layout 210 is manufacturable and/or satisfies a target yield on a wafer scale. Process window 255, in this context, describes the range of process parameters over which layout 210 is manufacturable (e.g., within a given tolerance). On a wafer scale, process variations across a wafer surface can lead to deviations in manufacturability and/or yield based on a physical location of patch 215 on a wafer. Such variations can be described for a given semiconductor manufacturing process by a map of the wafer (e.g., developed during calibration of the respective process). In this way, each constituent process of a semiconductor manufacturing pipeline (e.g., masking, lithography, etching, removal, etc.) can be described by a different map giving deviation from layout 210 as a function of position on a wafer surface. Using this map, yield parameter 240 can be correlated to a physical position of layout 210 on a surface of a wafer, from which process window 255 can be defined. Process window 255 can be defined for layout 210 and/or each patch 215 individually, such that process window 255 on a wafer scale can be defined to include values for manufacturing process parameters that satisfy a wafer-scale yield target (e.g., as part of multi-parameter optimization that includes yield).

At operation 209, the computer system generates and/or outputs manufacturability parameters 225 yield parameter 240, process window 255, optimization factor 241, or combinations thereof, corresponding to layout 210. As previously described, yield parameter 240 and/or individual manufacturability parameters 225 can be used in optimization of layout 210, for example, as part of PPAM optimization techniques. Outputting operations can be implemented as part of an interactive design/optimization environment, by which manufacturability data is viewed by a user of client computing device 110 and used to modify or otherwise improve layout 210 in subsequent iterations. Optimization can be automated (e.g., implemented without direct human intervention), such that the user can monitor optimization progress against one or more user-defined optimization parameters.

FIG. 3 is a schematic diagram illustrating an example process 300 for training a machine learning model to generate differentiable manufacturability parameters, in accordance with embodiments of the disclosure. Example process 300 can be implemented by one or more constituent elements of example system 100 of FIG. 1 as computer-implemented processes, including but not limited to server(s) 105 and/or client computing device(s) 110. Example process 300 includes operations 301-309 for accessing and/or receiving a design file 170, defining patches 315, generating one or more training pairs 321, generating training patch images 325, and predicting manufacturability parameters 330, as part of training untrained models 150.

As previously described, example system 100 includes trained model(s) 145, developed for design rules 140 from untrained model(s) 150. It is understood that training techniques differ for different model architectures, including supervised, semi-supervised, unsupervised, or other approaches. Description of example process 300 focuses on supervised training using labeled training data, but it is understood that other approaches can be used that are model-appropriate, should the models 145-150 incorporate additional and/or alternative model architectures.

Example process 300 is illustrated as a series of operations 301-309 implemented by a computer system, but it is understood that one or more of the operations 301-309 can be omitted, reordered, or divided. For example, in some embodiments, operations 301-307 are implemented by a separate process of data preparation from operation 309 involving training of untrained model(s) 150, as described in more detail in reference to FIG. 6. In some embodiments, example process 300 can be implemented as part of an interactive design environment, whereby a human user of the computer system can interact with design rules 140, training data 130, untrained models 150, and/or design files 170 during development of trained models 145.

At operation 301, example process 300 includes accessing and/or receiving design file 170. Design file 170 is an integrated circuit layout file that describes an integrated circuit layout. Design file 170 can be in compliance with one or more sets of design rules 140 (DRC-compliant) or out of compliance with design rules 140 (DRC-noncompliant). In the context of example system 100, accessing and/or receiving operations can include, but are not limited to, operations for accessing design file 170 from third database 165, receiving design file 170 from client computing device(s) 110, or receiving design file 170 from manufacturing system(s) 115. It is contemplated that example process 300 can generate training data with or without original design files 170 provided by manufacturing system(s) 115, for example, by using relevant design rules 140 to train untrained models 150.

At operation 303, example process 300 includes defining patches 315 using design file 170. As in FIG. 2, patches 315 can be defined such that they describe discrete portions of a layout. The discrete portions, in turn, can correspond to physical regions of the integrated circuit, such as an area of a layer of the layout. Alternatively, the discrete portions can correspond to physical implementations of logical functions described by layout 210, as implemented by the integrated circuit. For example, where patches 315 describe combinations of circuit elements that are electronically coupled to provide a particular functionality, the individual elements can be physically distant in the integrated circuit. In some embodiments, patches 315 represent design elements as polygons 211 defined by one or more edges and vertices.

At operation 305, training data 130 is generated for model training, which can optionally include generating labeled data 321. In this context, labeled data 321 are training data 130 including patches 315 and assigned manufacturability labels 323. Generating labeled data 321 can include perturbation of DRC-compliant and/or DRC-noncompliant layouts to generate a large set of training data 130 that includes distributions of values for design features and corresponding assigned manufacturability labels 323. Detailed description of design features, manufacturability parameters, and perturbation is provided in reference to FIGS. 4-5.

As part of operation 305, patches 315 can be checked against design rules 140. In some embodiments, design rules 140 include both local constraints and global constraints. Examples of local constraints include, but are not limited to, one-layer rules and two-layer rules. One-layer rules, for example, include width rules that specify a minimum width of polygons 211 in the design file 170. In another example, spacing rules specify a minimum distance between two adjacent polygons 211. A two-layer rule, by contrast, specifies a relationship between two layers. For example, an enclosure rule specifies that an object of one type, such as a contact or via, be covered by a metal layer of a minimum thickness.

As would be understood by a person having ordinary skill in the art, the nominal values for widths, spacings, and thicknesses are steadily decreasing as fabrication technology advances. With improved fabrication technology, design rules 140 impose increasingly more precise limitations on patches 315. In addition, it is understood that other design rules 140 are contemplated as part of example processes 200 and 300. As previously described, design rules 140 generally specify geometric and/or connectivity restrictions on design files 170 to account for variability and resolution limitations of semiconductor manufacturing processes and to preserve the functionality of the integrated circuit.

Identification of non-compliant patches can be implemented using database files directly (e.g., GDSII, OASIS-formatted layout files), but can also be implemented using other file formats that are specific to design rule checking (DRC) software for automated (e.g., without human involvement) validation of designs. In an illustrative example, training includes using a design rule checking system provided with design rules 140, for example, in the form of a DRC rule file specifying the manufacturer supplied design rules in machine readable language. The DRC checking system can read the GDSII file and the DRC rule file and report compliance of the design rules on the GDSII file. The output of the DRC checking system can be used in training, for example, as part of training model 150 to predict the manufacturability threshold of design rules 140 for a particular feature or features in a training patch 315.

Example process 300 can optionally include storing labeled data 321 in first database 125 as training data 130. In this way, example process 300 can be implemented as multiple parallel processes, where generating labeled data 321 is separated from training untrained model(s) 150. For example, example process 300 can optionally separate between operation 305 and operation 307 and can include accessing training sets of labeled data 321 from first database 125.

At operation 307, example process 300 includes generating training images 325 of training patches 320, as described in more detail in reference to images 220 of FIG. 2. It is understood that the operations of example process 300 describe training a machine learning model 150 that takes image-type inputs. For alternative model architectures, operation 307 can include generating an appropriate input for untrained model 150. For example, where untrained model 150 accepts vector type inputs, operation 307 can include generating an SVG type file describing vertices and edges of polygons 211.

At operation 309, training images 325 are inputted to untrained model 150. As described in reference to FIG. 2, untrained model 150 can include a convolutional neural network model, incorporating input and output layers and one or more hidden layers. As would be understood by a person having ordinary skill in the art, untrained model 150 can be fully connected or not fully connected, and can include hidden layer structure (e.g., depth, number of neurons, connectedness, etc.) selected to best generate predicted manufacturability parameter 330 without overfitting.

Operation 309 includes generating predicted manufacturability parameters 330 using untrained model 150. Untrained model 150 generates predicted manufacturability parameters 330 describing differentiable manufacturability parameters for labeled training patches 320. Predicted manufacturability parameters 330 are used as part of supervised training of untrained model 150, as described in more detail in reference to FIG. 3B and FIG. 5.

Data generated as part of example process 300, including labeled data 321, predicted manufacturability parameters 330, and/or training images 325, can be stored in one or more data stores, as part of parallel and/or distributed computing processes. As such, while the operations of example process are illustrated as discrete and serial sub-processes, it is contemplated that one or more of operations 301-309 can be implemented in parallel on multiple processors that can be physically separated into different physical systems.

Figure 3A:
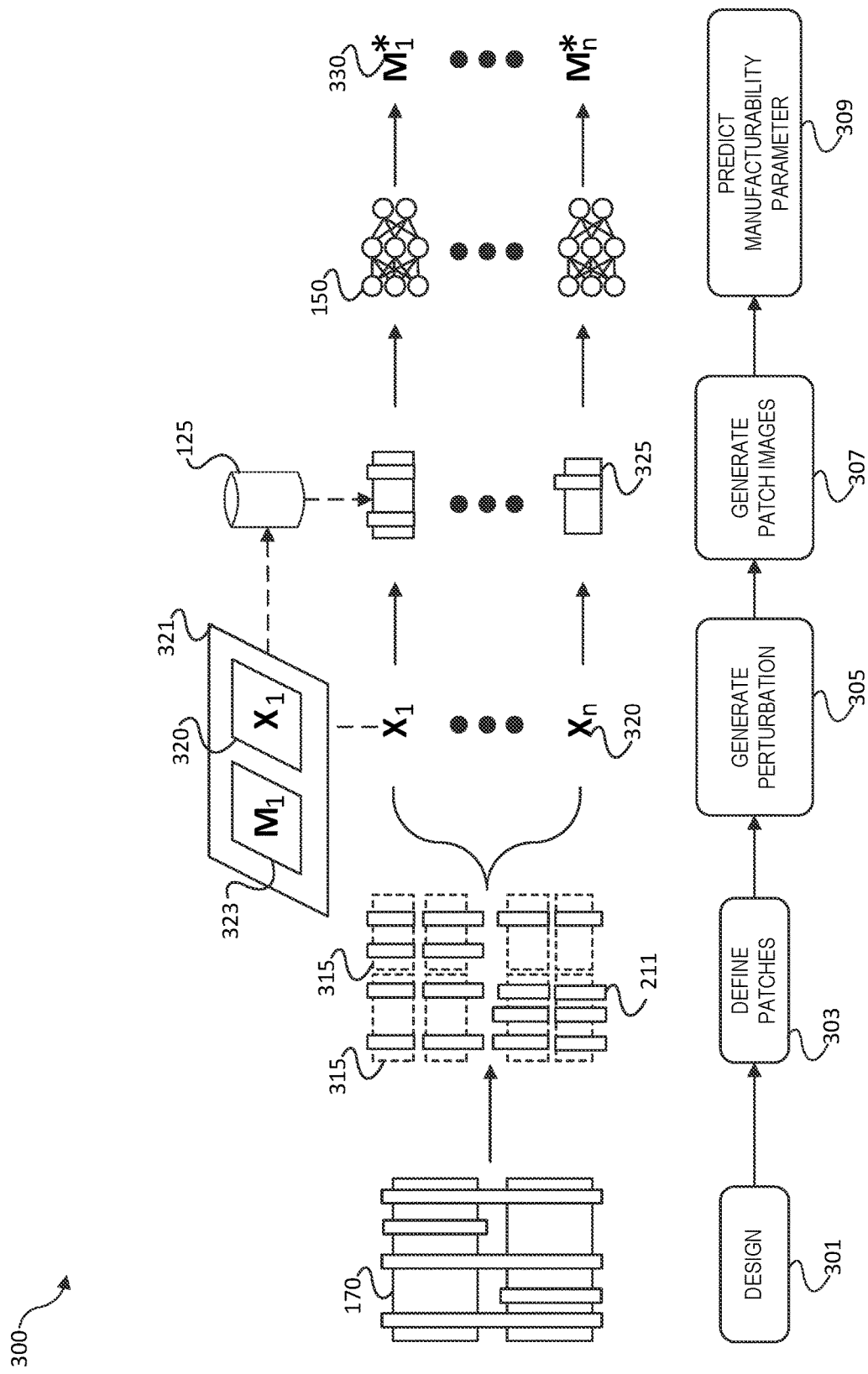
FIG. 3A is a schematic diagram illustrating an example process for training a machine learning model to generate differentiable manufacturability parameters, in accordance with embodiments of the disclosure.
Figure 3B:
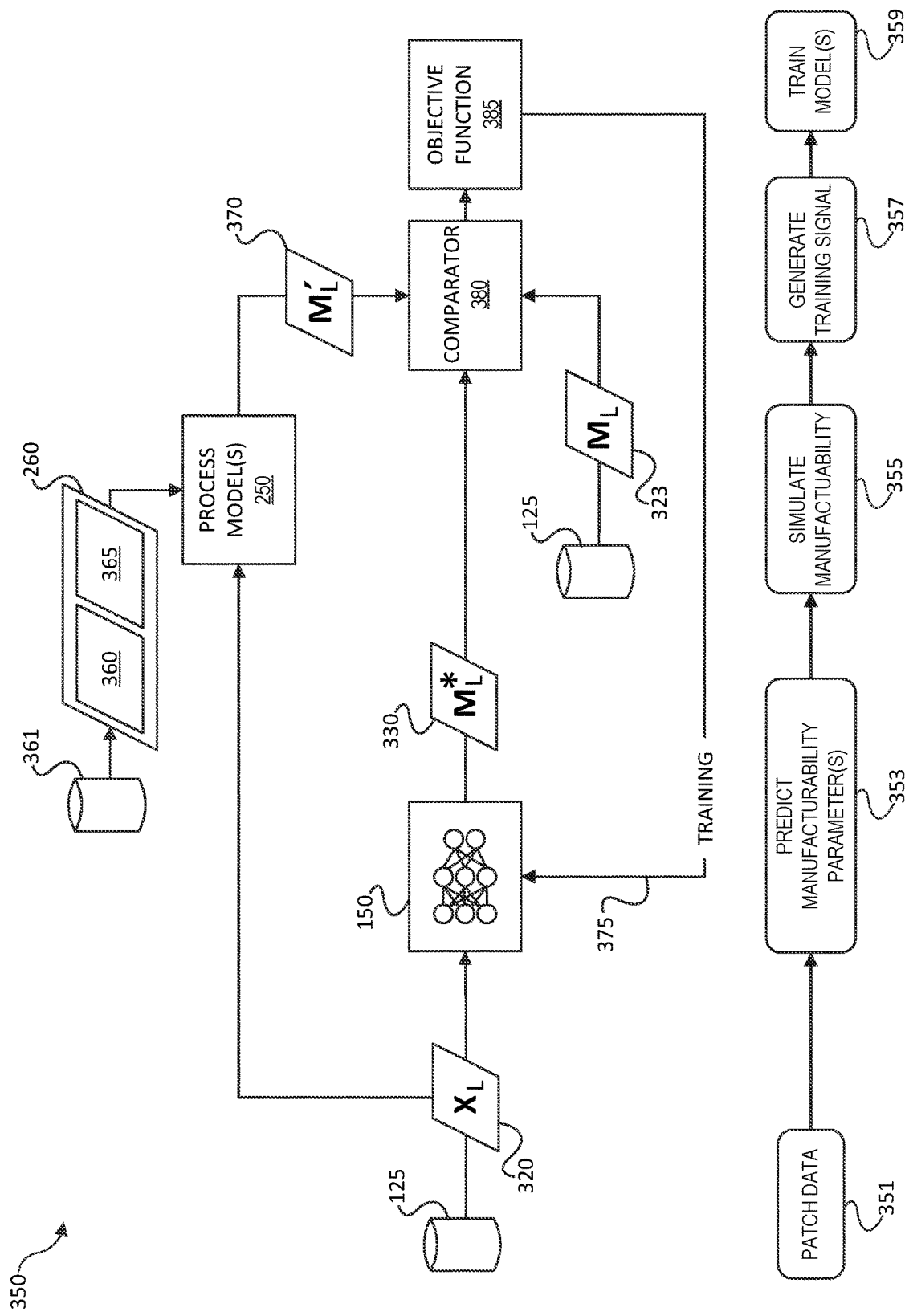
FIG. 3B is a schematic diagram illustrating an example process for reintroducing physical information as part of training a machine learning model to generate differentiable manufacturability parameters, in accordance with embodiments of the disclosure.

FIG. 3B is a schematic diagram illustrating an example process 350 for reintroducing physical information as part of training a machine learning model 150 to generate differentiable manufacturability parameters 225, in accordance with embodiments of the disclosure. In some embodiments, preparation of untrained models 150 includes training by implementing physical process models 250 to simulate the manufacture of training patches 320. Constituent operations 351-359 of example process 350 improve the performance of trained models 145 by reintroducing physically meaningful information that is absent from Boolean design rules.

Process model(s) 250, as described in more detail in reference to FIG. 2, can simulate one or more deposition and removal processes (e.g., photolithography, deposition, reactive ion etching, CMP, or the like) as an approach to predicting the physical structures resulting from manufacturing training patches 320. Process model(s) 250 can be configured to be process agnostic, being tailored to a given semiconductor manufacturing process 115 using process data 260 that can include process characterizations 360. The resulting physical structures can be assessed against physical criteria 365 rather than design rules 140 to determine a simulated manufacturability parameter 370 ($M_L'$). Simulated manufacturability parameter 370, in turn, can be used with predicted manufacturability parameter 330 to generate a training signal 375.

Advantageously, including process model(s) 250 as part of training untrained model(s) 150 can improve performance of example system 100 in multiple ways. First, simulated manufacturability based on process data 260 reintroduces physically meaningful manufacturability information that is absent from Boolean design rules 140. Second, training untrained models 150 using a realistic physical simulation of manufacturing systems 115 permits trained models 145 to predict manufacturability 225 and yield parameters 240 using retention of function as opposed to edge-placement-error (EPE) as a guiding criterion for design acceptability. In this way, layout 210 can include curvilinear polygons 211 that do not abide by Manhattan routing conventions or that otherwise violate one or more design rules 140, but still provide intended connectivity and electrical performance. Third, training untrained models 150 using process model(s) 250 can introduce spatial variation information into model predictions that can improve overall wafer-scale yield optimization.

With regard to wafer-scale yield, semiconductor manufacturing systems 115 can exhibit non-uniform performance across the surface of a semiconductor wafer during manufacturing. For example, planar plasma sources used to deposit or to remove materials can exhibit spatially localized variability in plasma density, resulting at least in part from contamination of electrode surfaces and/or thermal-material properties of refractory electrodes. In this way, wafer-scale deposition and removal (e.g., reactive ion etching, metal or dielectric deposition), lithography, and other processes implemented as part of manufacturing an integrated circuit according to layout 210 can produce different structures at different positions on a wafer for the same nominal process. With process characterization 355 data, example process 350 can include training models 150 to predict manufacturability parameters 330 in a location specific manner unavailable with design rules 140. Specificity with respect to position permits overall wafer-scale yield to incorporate physically meaningful information for semiconductor manufacturing process 115 in particular and facilitating the inclusion of yield as a smooth and differentiable criterion in multi-parameter optimization schemes, such as Power, Performance, Area optimization.

Example process 350 is illustrated as a series of operations 351-359 implemented by a computer system, but it is understood that one or more of the operations 351-359 can be omitted, reordered, or divided. For example, in some embodiments, operations 351-353 and 357-359 are implemented by a separate process than the simulation operations of operation 355. In some embodiments, constituent operations of example process 350 can supplement operations of example process 300 to refine model predictions with physically meaningful information. In some embodiments, example process 350 can be implemented as part of an interactive model configuration environment, whereby a human user of the computer system can interact with semiconductor manufacturing system 115, as well as other elements including but not limited to design rules 140, training data 130, untrained models 150, during development of trained models 145.

At operation 351, training patch 320 data generated as part of operation 305 of example process 300, as described in more detail in reference to FIG. 3A, are accessed, received, or otherwise provided from first database 125. As described in more detail in reference to FIG. 3A, training patches 320 can be generated by perturbation of patches 315. Training patches 320 can be evaluated against design rules 140 as an approach to increasing the volume of labeled training data 321 available to train untrained models 150.

At operation 353, training patches 320 are inputted to untrained model(s) 150, as part of generating predicted manufacturability parameters 330 ($M_L^*$). As described in more detail in reference to FIG. 3A, predicted manufacturability parameters 330 can be real numbers as opposed to Boolean values, that can represent the probability that a given training patch 320 ($X_L$) will be manufactured within an allowable tolerance. It is understood that operation 353 can include one or more of the sub-operations described in reference to operation 309 of example process 300.

At operation 355, training patches 320 are inputted to process model(s) 250. In some embodiments, process characterization 360 data and physical criteria 365 are inputted with training patches 320 to provide physically meaningful manufacturability parameters for a particular semiconductor manufacturing process 115. As such process characterization 360 data and physical criteria 365 can be accessed, received, or otherwise provided from a data store 361 of process data 260. The data store 361 can be co-located with the computer system implementing example process 350 (e.g., server(s) 105, client computing device(s) 110) and/or can be maintained and/or operated by semiconductor manufacturing system 115. In this way, process data 363 can be provided from semiconductor manufacturing system 115 as part of an interactive environment for preparing/configuring models 150 for multi-parameter optimization of layouts 210.

As described in more detail in reference to FIG. 2, process model(s) 250 can include analytical and/or numerical models developed to describe the operation of one or more component systems of semiconductor manufacturing systems 115. In operation, process model(s) 250 can receive training patch 320 and can discretize or otherwise generate an initial state using the numerical description of training patch 320 (e.g., by defining a map of voxels each corresponding to a set of material and physical properties). The initial state can be used to simulate a fabricated integrated circuit element corresponding to training patch 320. Unlike design rules 140, process models 250 incorporate physically meaningful information descriptive of a particular semiconductor manufacturing system 115, based at least in part on physical models describing the component processes (e.g., lithography, deposition, etching, polishing, etc.) making up the sequence of processing operations applied during fabrication of training patch 320 in a final manufactured integrated circuit. In this way, incorporating process models 250 into example process 350 permits the physical compatibility of training patch 320 with semiconductor manufacturing system 115 to be used to train untrained models 150. With such information, trained models 145 can accurately predict manufacturability parameter 330 at feature values relatively far from a design constraint encoded into design rules 140 as a Boolean output 415 (in reference to FIG. 4A), for which information is otherwise absent from design rules 140. As such, training operations of example process 350 can reduce the tendency of trained models 145 to reproduce design rules 140 rather than a physically meaningful description of manufacturability.

The output of process model(s) 250 can be or include a final state reflecting the end result of fabrication of an integrated circuit element corresponding to training patch 320. From the final state, simulated manufacturability parameter 370 can be generated to be used in comparison/training of untrained model(s) 150. As process models 250 can incorporate probabilistic mechanisms that implicate statistical methods, simulated manufacturability parameter 370 can represent a probability that training patch 320 results in an acceptable final state for semiconductor manufacturing system 115 described by process data 363. In some embodiments, process model(s) 250 are used to simulate the final state for training patch 320 multiple times, from which a statistical measure of manufacturability is determined.

Advantageously, in contrast to conventional design rule 140 techniques, the tolerances used in example processes 300 and 350 can be based on retention of function, rather than edge placement. Edge-placement error is a measure of precision and reproduction fidelity to an input layout to semiconductor manufacturing process that forms the basis of design rules 140. In contrast, function-preservation can form the basis of an alternative tolerance criterion that permits layouts 210 to depart from Manhattan routing conventions, while also optimizing for performance, power, area, yield or combinations thereof. Rectilinear routing conventions (termed "Manhattan Routing"), while useful at larger scale process nodes, impair manufacturability at smaller scales where right-angle bends and straight sidewalls are physically disfavored. For example, lithographic processes can be constrained by optical properties of radiation sources, such as spot size or resolution limits, such that sidewalls of polygons 211 when manufactured may exhibit a characteristic variation on the order of nanometers. Such variation may result in a significant edge-placement-error with negligible or no effect on function of an interconnect described by polygons 211. Training models 145 and 150 to tolerate edge-placement-error in favor of optimizing for function can permit layout 210 to include patches 215 that would otherwise violate design rules 140, but provide consistent, or even improved, performance with respect to rectilinear layouts 210 against a set of optimization parameters (e.g., as reflected by optimization factor 241).

At operation 357, the computer system generates training signal 375 using predicted manufacturability parameter 330, simulated manufacturability parameter 370, and manufacturability label 323. Generating training signal 375 can include evaluating an objective function 385 (e.g., an error function, loss function, or the like) using the output of a comparator 380, as would be understood by a person having ordinary skill in the art of machine learning. Including manufacturability label 323 as part of training untrained model(s) 150 permits trained models 145 to retain information about the Boolean criteria encoded in design rules 140. Advantageously, retaining information from design rules 140 can improve training system performance, for example, by weighting the output of comparator 380 toward an acceptable design or away from an unacceptable design, as an approach to reducing the departure of trained models 145 from design rules 140. In an illustrative example, process model(s) 250 can converge to a stationary point in a feature space that includes multiple stationary points, of which one or more are nearer to a constraint applied by design rules 140 and others are farther in the feature space. As such, including information about design rules 140 when generating training signal 375 can permit trained models to penalize physically manufacturable layouts 210 that diverge too far from design rules 140.

At operation 359, training signal 375 is used to modify one or more parameters of untrained model(s) 150. In some embodiments, untrained model(s) 150 include multiple layers of nodes including an input layer, and output or activation layer, and one more hidden layers. Each node can be described by a learned weight parameter that is modified as part of training operations. Additionally or alternatively, one or more hyperparameters can modified as part of training, based at least in part on training signal 375. Over multiple training epochs, training signal 375, representative of a magnitude of a loss function, error function, or other measure of divergence from a training objective implemented by objective function 385, can converge as learned parameters are fitted and untrained models 150 are trained to predict manufacturability parameters 225.

Figure 4A:
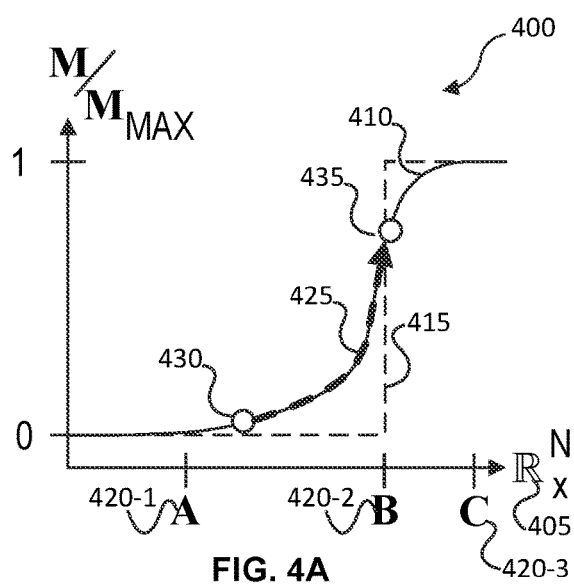
FIG. 4A is an example graph describing a differentiable manufacturing parameter for a feature of an integrated circuit design, in accordance with embodiments of the disclosure.
Figure 4B:
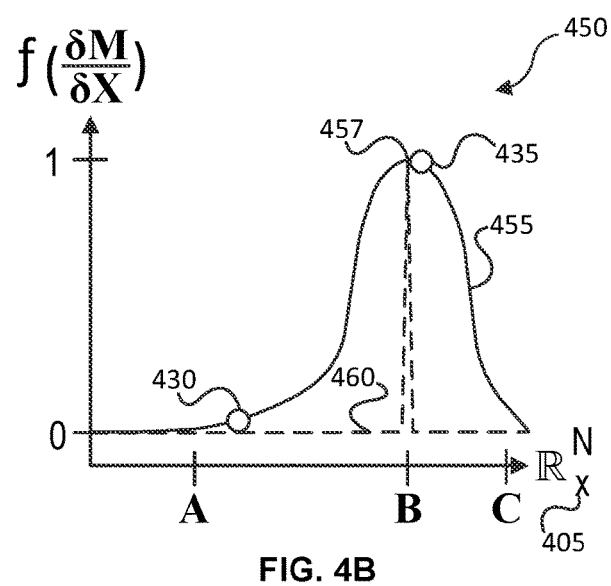
FIG. 4B is an example graph describing a differentiated manufacturing parameter for the feature of the integrated circuit design, in accordance with embodiments of the disclosure.
Figure 4C:
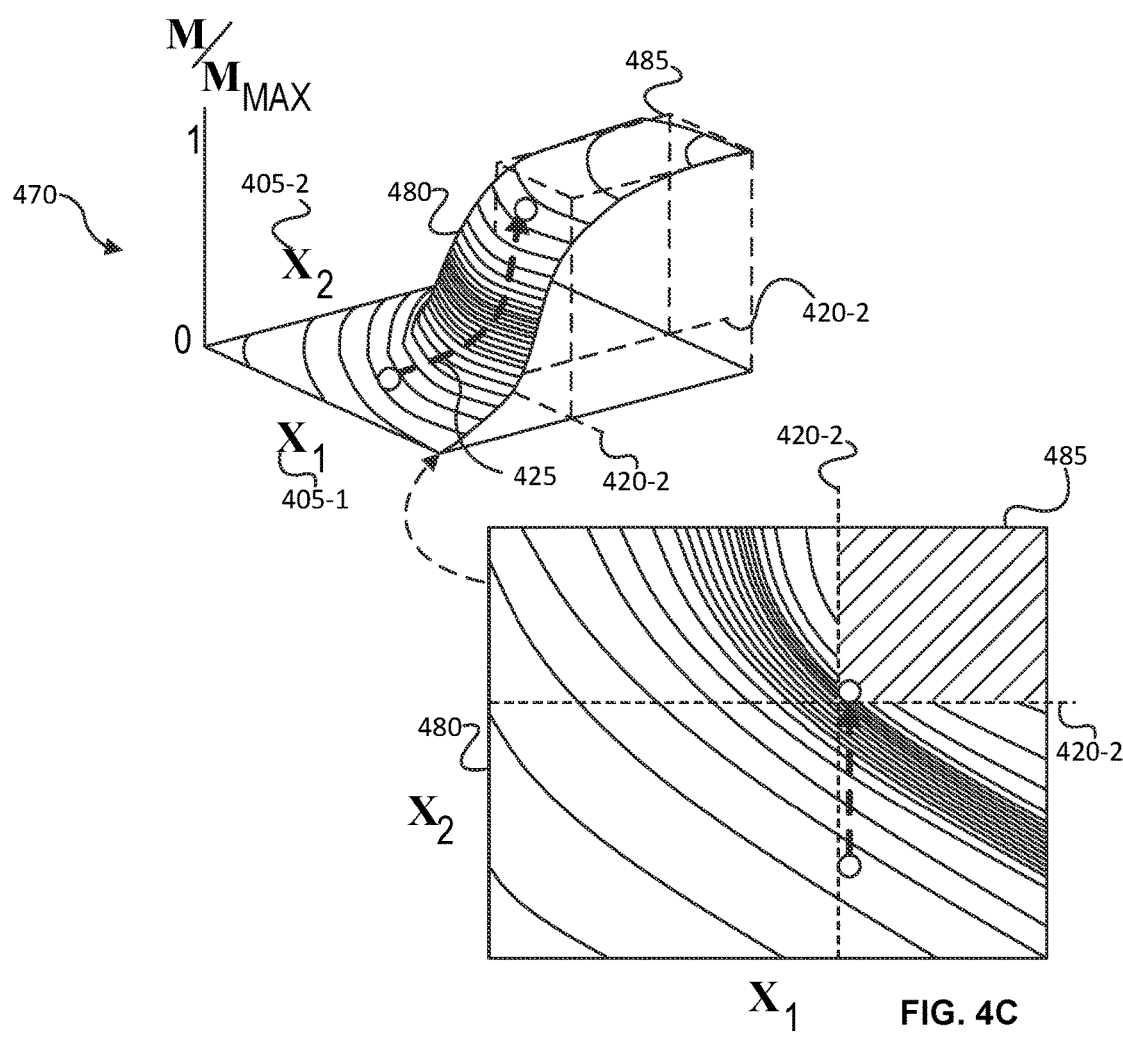
FIG. 4C is an example graph describing a coupled manufacturing parameter for two features of an integrated circuit design, in accordance with embodiments of the disclosure.

FIGS. 4A-4C describe continuous and differentiable manufacturability parameters 225 in terms of one or more features 405 of layout 210 and/or patch(es) 215. In the context of design optimization for manufacturability and yield, FIGS. 4A-4C represent manufacturability parameter 225 ("M") as a function of a continuous physical parameter "X" that is a member of a feature set $\mathbb{R}$ over which layout 210 or patch(es) 215 can be described. In this way, a patch-level manufacturability parameter 225 can depend on multiple inter-related features 405 for which the relationships between features 405 are not intuitive. In an illustrative example, "X" can describe a spacing between two polygons 211. In another example, "X" can describe a minimal dimension of a polygon 211 that is limited by the optical resolution of a lithography process.

In the context of polygons 211, a feature can include, but is not limited to, a characteristic aspect of a polygon 211 or multiple polygons 211 that is constrained by a design rule 140. In the context of a spacing constraint and a width constraint, the design rules 140 can be coupled, for example, where a width constraint violation is corrected by widening a polygon 211, resulting in a violation of a spacing constraint. While the typical design rule checking approach returns a Boolean output, represented in FIGS. 4A-4C as dashed lines, manufacturability parameters 225 are continuous over $\mathbb{R}$ permitting the relationships between multiple constraints to be derived in terms of design features 405 and the results to be used for gradient-based optimization.

FIG. 4A is an example graph 400 describing a differentiable manufacturability parameter 225 for a feature 405 of integrated circuit layout 210, in accordance with embodiments of the disclosure. In example graph 400, the ordinate describes values of feature 405 and the abscissa describes manufacturability parameter 225. Example graph 400 describes a differentiable manufacturability curve 410 and a Boolean output 415, defining points 420 that describe positions on differentiable curve 410. Example graph 400 includes an optimization trajectory 425 between an initial state 430 and a modified state 435 at an improved manufacturability parameter 225.

The shape of the Boolean output 415 reveals that typical design rule checking software produces a non-differentiable output that is unsuitable for gradient based optimization techniques. At a first point 420-1, differentiable manufacturability curve 410 begins to increase. In contrast, Boolean output 415 steps up in value from "false" to "true" only at a second point 420-2, represented as a normalized range from zero to one to account for nonzero minima and arbitrary maxima for Boolean output 415 and differentiable manufacturability curve 410. Boolean output 415 retains a "true" value for all values of feature 405 up to a third point 420-3, while differentiable manufacturability curve 410 describes a smooth and continuous curve between first point 420-1 and third point 420-3. The curves illustrated in example graph 400 are intended as illustrative examples, rather than realistic depictions of actual data describing differentiable manufacturability parameters 225. In this way, the relative positions of first point 420-1, second point 420-2, and third point 420-3 on the ordinate, the shape of differentiable manufacturability curve 410, and the range of values described are understood to be non-limiting.

In some embodiments, functional relationships describing manufacturing parameter 225 include higher-order terms resulting from cross-coupling interactions between multiple features in layout 210 and/or patch 215. In this way, differentiable manufacturability curve 410 can include inflection points, local maxima, or other points 420 that differ from those illustrated. Examples of interactions can include, but are not limited to, width constraints coupled with spacing constraints, connectivity constraints coupled with position constraints, or the like.

Optimization trajectory 425 is an illustration of the outcome of one or more techniques that can be implemented to optimize feature 405 with respect to manufacturability, based on manufacturability parameter 225 representing a continuous and differentiable function of feature 405 (e.g., M=f(X)). Optimization trajectory 425 can represent the result of maxima-finding techniques such as steepest ascent, random walk, or the like. For gradient-based techniques, the differentiability of manufacturability curve 410 differs from Boolean curve 415, which is neither continuous nor differentiable and represents a step change from false to true at second point 420-2. As described in more detail in reference to FIG. 6, optimization of layout 210 can include generating a modification of layout 210 based on optimization of manufacturability parameter 225 with respect to one or more features 405, in reference to optimization criteria (e.g., as part of PPAM optimization of layout 210).

FIG. 4B is an example graph 450 describing a differentiated manufacturing parameter 455 for feature 405 of integrated circuit layout 210, in accordance with embodiments of the disclosure. In example graph 400, the ordinate describes a function of the local derivative of manufacturability parameter 225 with respect to feature 405 for a derivative curve 455 and a differentiated Boolean output 460, and the abscissa describes a function of the local derivative of manufacturability parameter 225.

A function of the local derivative of manufacturability parameter 225 is shown to account for other transformations applied to the local derivative, such as normalization, such that the range of values can be illustrated as being from zero to one and to account for the discontinuity in Boolean output 460 at second point 420-2. As a step-function, Boolean output 460 is undefined at second point 420-2, but is illustrated as a Dirac delta function with a peak value of one for clarity of explanation.

Example graph 450 describes the value of the local derivative being positive over the range of values of feature 405, but it is understood that the local derivative can be negative over at least a portion of the range of values of feature 405. Additionally, a local maximum 457 of the derivative curve 455 coincides with the discontinuity of the Boolean output 460 at second point 420-2. It is understood that the shape of each respective local derivative curve with respect to the value of feature 405 can differ, being described by different stationary points and that the local maximum 457 can occur at values of feature 405 other than second point 420-2.

As described in more detail in reference to FIG. 3, development of trained model(s) 145 can include a process of generating training data to estimate or determine second point 420-2 (e.g., values of feature 405 at which the Boolean output 415 steps from false to true). For example, design rules 140 can be provided as an application in software that does not describe functional dependencies of manufacturability parameter 225 on values of feature 405. Through training models 150 on sets of training data 130 that reproduce realistic ranges of feature 405 and are labeled using design rule checking software, trained model 145 can generate manufacturability parameter 225 to predict second point 420-2.

In some embodiments, trained model 145 includes learned parameters that are developed using physical simulations of manufacturing processes, as well as other elements that reflect physical dynamics of semiconductor manufacturing systems 115. With physical dynamics, second point 420-2 can coincide with local maximum 457 of derivative curve 455, but trained model 145 can also generate manufacturability parameter 225 while accounting for safety factors or other adjustments to second point 420-2 included in design rules 140, such that second point 420-2 differs from local maximum 457. For example, while second point 420-2 corresponds to a "DRC-clean" transition for feature 405, a design process can identify an acceptable value of manufacturability parameter 225 that is below that of second point 420-2, as it represents a satisfactory yield probability for the target application, independent of standards set by semiconductor manufacturing process 115. In this way, the techniques described herein can replace or supplement the collaborative adjustment of design rules that typically occurs between semiconductor foundries and integrated circuit designers.

Gradient based methods for optimization of manufacturability parameter 225 over feature 405 use iterative techniques applied to derivative curve 455 to find local maximum 457. Finding local maximum 457 is one example technique for optimizing layout 210 and/or patch 215, because it permits the value of feature 405 to be modified to the point that polygon 211 described by feature 405 is manufacturable. For example, where feature 405 represents a width of polygon 211, initial state 430 can represent a width below a resolution threshold of the optical lithography system that violates design rules 140. Optimization of initial state 430 with respect to feature 405, therefore, can include generating modified state 435 that describes a width of polygon 211 that is compliant with design rules 140. While any width beyond second point 420-2 satisfies design rules 140, gradient based techniques can use derivative curve 455 to identify the smallest value of feature 405 that exceeds second point 420-2 and can use the smallest value to generate modified state 435.

FIG. 4C is an example graph 470 describing a coupled manufacturing parameter for two features 405 of integrated circuit layout 210, in accordance with embodiments of the disclosure. As described in reference to FIG. 4A and FIG. 4B, feature 405 can interact with other features 405 of layout 210 or patch 215. As such, differentiable manufacturability parameter 225 can depend on more than one feature 405. In example graph 470, the ordinate describes normalized manufacturability parameter 225 with respect to a first feature 405-1 and a second feature 405-2 defining a manufacturability surface 480 and a Boolean surface 485, and the abscissas describe values of first feature 405-1 and second feature 405-2 on respective axes.

Example graph 470 represents an illustrative embodiment of two interacting features for which manufacturability parameter 225 increases as both first feature 405-1 and second feature 405-2 increase and decreases when either first feature 405-1 or second feature 405-2 decreases. Where initial state 430 includes non-compliant values of features 405-1 or 405-2, Boolean surface 485 will describe a false value. It is understood that interactions between features 405 can differ from the illustration of example graph 470. For example, where features 405 are coupled by negative interactions, modification of first feature 405-1 at the expense of second feature 405-1 will reduce manufacturability of patch 215.

Example graph 470 further illustrates how modification of manufacturability parameter 225 to generate modified state 435 accounts for individual feature 405 compliance with design rules 140. Where first feature 405-1 is compliant, but second feature 405-2 is non-compliant, Boolean surface 485 is false. Prediction of modified state 435, however, can include modifying second feature 405-2 but not first feature 405-1, to arrive at modified state that is optimized for both first feature 405-1 and second feature 405-2. To that end, trained models 145 can be used to generate manufacturability surface 480 that accounts for second point 420-2 in Boolean surface 485. The resulting continuous and differentiable surface can be used in subsequent processes to predict modified state 435.

Figure 5:
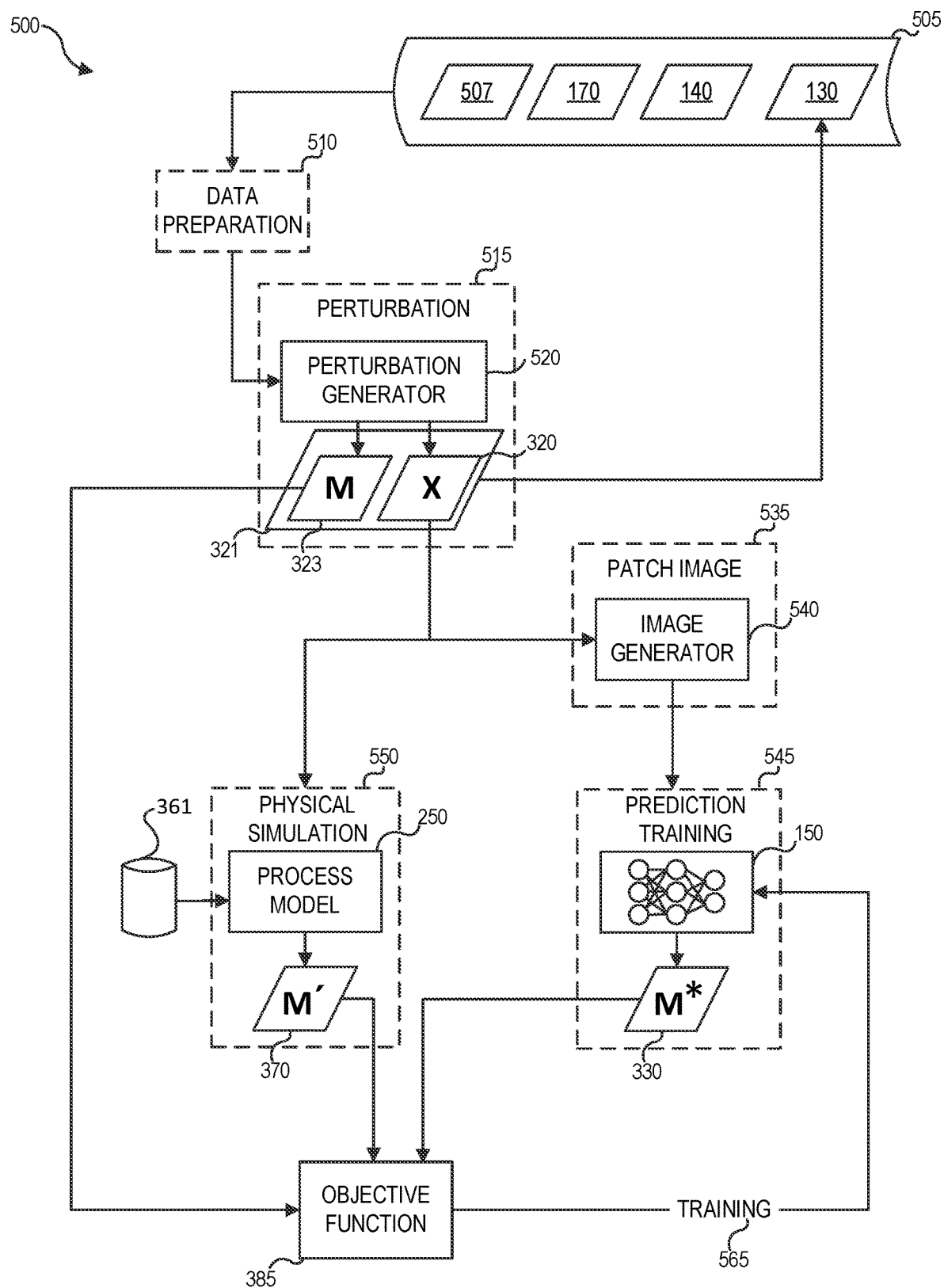
FIG. 5 is a block flow diagram illustrating data flows in an example process for training a machine learning model to determine manufacturability of an integrated circuit layout, in accordance with embodiments of the disclosure.

FIG. 5 is block flow diagram illustrating data flows in an example process 500 for training a machine learning model 150 to generate continuous and differentiable manufacturability parameters 225, in accordance with embodiments of the disclosure. Example process 500 is implemented by one or more computer systems, such as server(s) 105 and/or client computing device(s) 110 of FIG. 1 and includes process blocks that describe constituent operations of example processes 200-300 of FIGS. 2-3. In this way, example process 500 focuses on data flows involved in training operations. The constituent process blocks making up example process 500 include: data storage 505, data preparation 510, perturbation 515, image generation 535, and prediction training 545. Blocks also include perturbation generator 520, image generator 540, and objective function 560.

Data storage 505 includes training data 130, design rule data 140, design files 170, process simulations and yield data 507 and is an example of databases 125, 135, and 165. As described in reference to FIG. 1, data storage can be implemented as physical storage, distributed storage, or a combination thereof.

Data preparation 510 implements operations on design files 170 to define patches 215, as described in more detail in reference to FIGS. 2-3. For example, data preparation can include segmentation based on logical function, based on a predetermined size of a patch, or a combination thereof. Design files 170 include available compliant designs and/or non-compliant designs and can include proprietary design files prepared or provided from foundries and stored in data storage 505.

In some embodiments, data preparation 510 also includes input/output operations to access design files 170 from data storage 505, for example, as part of automated (e.g., without human involvement) generation of training data 130. To that end, design files 170, design rules 140, and/or training data 130 can be labeled by metadata permitting computer systems to identify design files 170 that are compliant with a particular set of design rules 140 and to identify training data 130 with design files 170 and/or design rules 140. While types of design rules 140 can be consistent between manufacturing systems 115, variability between different sets of design rules 140 is significant, such that training data for a given set of design rules 140 is likely to be ineffective for a different set of design rules 140. Similarly, types of design files 170 can vary between different manufacturing systems 115, for example, where the integrated circuits described include different materials and/or different structures, some design rules 140 can be inapplicable for some design files 170. Advantageously, associating training data 130, design rules 140, and design files 170 can improve overall system performance, for example through database structure optimization and reduction of overall data volume, by accessing appropriate design files 170 corresponding to particular design rules 140, and generating meaningful training data 130. Similarly, trained models 145 can be labeled with similar identifier information, such that identifier data received with layout 210 can be used to select a trained model 145 that is trained for the corresponding semiconductor manufacturing process 115.

Perturbation 515 includes generating labeled data 321 including DRC compliant and DRC non-compliant training patches 320 and manufacturability labels 323 assigned using process simulation and/or process yield data 507. Perturbation 515 operations can describe a displacement of one edge in one polygon 211, a displacement of multiple edges in a polygon 211, a displacement of a polygon 211, resizing a polygon 211, dividing a polygon 211, adding one or more vertices to a polygon 211, or a combination thereof. In some embodiments, perturbations can be applied to multiple polygons 211. Polygons 211, while illustrated as rectangles in FIGS. 2-3, can include 3 or more vertices.

Advantageously, implementing perturbations on a patch-level, as illustrated in FIG. 3, reduces the risk of overfitting during model training by increasing the number of perturbations 410 and training pairs 321 for a given number of available design files 170, while also reducing the computational resource demand associated with processing and storing entire design files 170 for which a single edge in a single polygon 211 is perturbed. This discussion of perturbation is focused on patch-level design rules 140, but it is understood that design rules 140 also apply constraints to design level features. For example, total area is a typical constraint for an integrated circuit design layout. To that end, the operations of example flow 500 can also be implemented to train models 150 to predict manufacturability on diverse levels of granularity. For example, trained models 145 can be developed to generate differentiable manufacturability parameter 225 values for patch-level design rules 140, design level rules 140, or combinations thereof.

Through perturbation of patches 211, a large and representative set of both DRC compliant and DRC non-compliant training data 130 can be generated from a sparse dataset of compliant and non-compliant layouts that includes a distribution of training patches 320 paired with assigned manufacturability labels 323. Assigning a manufacturability label 323 can include checking the output of perturbation generator 520 against a DRC engine that is configured to implement design rules 140. Detailed process simulations describing at least part of semiconductor manufacturing process 115 can also be included. In an illustrative example, a process simulation can include deterministic and/or probabilistic models for an optical lithography process that generates a simulated result corresponding to a patch 215. The simulated result can be compared to design rules 140 and or fabricated measurements and yield data to determine whether the simulated result complies with manufacturability standards. In this way, large datasets of training data 130 can be prepared describing multiple designs and process conditions that are labeled with representative manufacturability parameters that are not Boolean values.

Image generation 535 describes one or more operations for generating an image of training patches 320, as described in more detail in reference to FIG. 3. Image generator 540 can be or include algorithms in software for receiving a layout file or other data format describing a given training patch 320, generating an image describing the training patch 320 for use in training untrained model 150. Image generation can include generating a binary mask, for example, where polygons 211 are represented as true values and background as false values. Image generator 540 can determine the size, location, and orientation of polygons 211 in the image using vector information defining positions of vertices and/or edges of polygons 211.

Once generated, image data is passed to prediction training 545. Prediction training 545 includes inputting image data describing training patches 320 to untrained model 150, outputting predicted differentiable manufacturability parameter 330, and receiving a training signal 565 from objective function 560. The operations of example data flow 500 are understood to form a part of an iterative process, including using training signal 565 to modify one or more learned parameters of untrained model 150. In some embodiments, models 145 and 150 include hyperparameters, such that training untrained model 150 includes tuning hyperparameters, as well.

Prediction training 545 outputs predicted differentiable manufacturability parameter 330 to objective function 560. Objective function 560 describes a loss function or other optimization algorithm that receives as inputs assigned manufacturability label 323 and predicted differentiable manufacturability parameter 330. The inputs are compared, for example, at least in part by determining a difference between the two input vectors. The comparison can be used as a basis for generating training signal 565. It is understood that multiple different approaches can be used to train machine learning models, some of which are better suited for particular architectures. Advantageously, perturbation approaches described in reference to FIGS. 3-5 generate labeled training data 130, thereby facilitating supervised learning techniques that can be paired with rules-based models using design rules 140 to label training data 130, for example, as part of automated (e.g., without human involvement) software to generate and store training data 130.

In some embodiments, training can be supplemented by reintroduction of physically meaningful information by generating simulated manufacturability parameter 370, as described in more detail in reference to FIG. 3B. Physical simulation can permit untrained model(s) 150 to be trained to de-emphasize edge-placement-error as a figure of merit for manufacturability, as part of enabling curvilinear layouts 210. As previously described, process data 250 can be accessed from process data store 361 as an input for process model(s) 250 that describe one or more constituent processes making up semiconductor manufacturing system 115. Training signal 565, in this way, can guide the modification of learned parameters of untrained model(s) 150 away from simple reproduction of design rules 140 and toward physically meaningful manufacturability data.

Multiple training signals 565 can be generated for a volume of training data 130, such that untrained model 150 learns one or more parameters. Over a number of training epochs, untrained model 150 can converge to a set of learned parameters that permit precise and accurate prediction of assigned manufacturability label 323 and/or simulated manufacturability parameter 370. At such time, untrained model 150 can be considered to be trained, and can be deployed, as described in more detail in reference to FIG. 2. It is understood that design rules, layout files 170, physical simulations 550 and other factors can change over time, which can motivate retraining of trained models 145. In this way, untrained model 150, described in the context of example process 500 as being trained for the first time, can also represent a previously trained model 145 that is retrained for an update to design rules 140 or with new training data.

Figure 6:
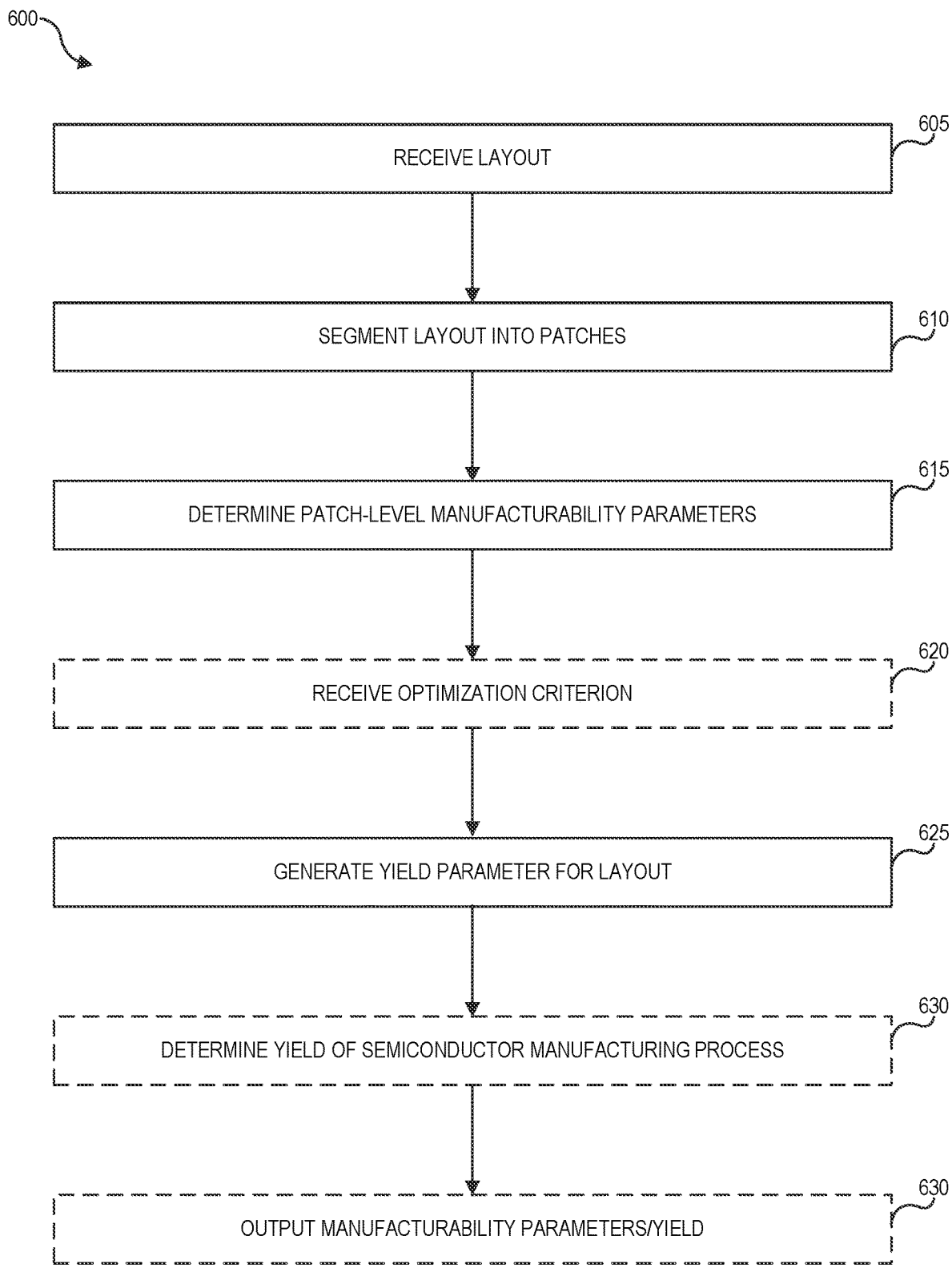
FIG. 6 is a block flow diagram of an example process for determining manufacturability of an integrated circuit layout, in accordance with embodiments of the disclosure.

FIG. 6 is a block flow diagram of an example process 600 for determining manufacturability of an integrated circuit layout, in accordance with embodiments of the disclosure. Example process 600 describes an example of operations implemented by a computer system (e.g., server(s) 105 of FIG. 1) as part of deploying trained model(s) 145, as described in more detail in reference to example process 200 of FIG. 2. The order in which some or all of the process blocks appear in process 600 should not be deemed limiting. Rather, one of ordinary skill in the art having the benefit of the present disclosure will understand that some of the process blocks can be executed in a variety of orders not illustrated, or in parallel.

At block 605, the computer system receives layout 210 describing an integrated circuit layout. Layout 210 can be received from client computing device 110 over network 120, or can be retrieved from storage, such as third database 165 storing design files 170. Layout 210 can be formatted as an integrated circuit layout file, as is typically used during design and validation of integrated circuit layouts against design rules 140 for a given semiconductor manufacturing system 115. Layout 210 describes masks that are used to pattern photoresist. The photoresist is used during processing of a semiconductor wafer to define regions of conductors, semiconductors, refractory materials, or other materials that are deposited or removed as part of manufacturing an integrated circuit. Masks can be binary masks, describing each type of removal or deposition separately.

At block 610, the computer system segments layout 210 into patches 215. In some embodiments, design rules 140 are constraints on allowed mask designs. In this way, segmentation can define different patches for each layer of layout 210. In an illustrative example, a design for metal wires connecting to a circuit element can include information describing both conducting and non-conducting materials. Each respective layer of a design, described by different masks, can be constrained by a respective set of design rules 140, such that different trained models 150 are prepared for different layers of a design file that describe different masks, and segmentation at block 610 proceeds by defining different patches for different layers of layout 210. Additionally or alternatively, a trained model 145 can be trained with one set or subset of design rules 140 and another trained model 145 can be trained with a different set or subset of design rules 140, with which yield parameter 240 can be generated. As layout 210 can include multiple layers, patches 215 can be labeled with metainformation to track position within a layer and to identify the layer from which each patch 215 originates. Similarly, metainformation can be generated to identify polygons, edges, and locations in each patch. Such metainformation facilitates generation of design yield 240 during deployment of trained models 145, such as through rules-based model(s) 230.

Subsequent defining patches, the computer system generates a differentiable manufacturability parameter 225 for each patch 215 at operation 615. Each respective differentiable manufacturability parameter 225 can be predictive of the manufacturability of the patch 225 by semiconductor manufacturing process 115. As described in more detail in reference to FIGS. 1-2, generating differentiable manufacturability parameters 225 includes generating images 220 of non-compliant patches 220 and inputting images 220 to trained model(s) 145 that are trained to output differentiable manufacturability parameters 225. In some embodiments, a single trained model 145 is used for images 221. In some embodiments, multiple trained models 145 are used for different subsets of patches 215 and/or polygons 211. For example, different layers of layout 210 can be processed by different trained models 145.

In some embodiments, the computer system optionally receives a manufacturing optimization criterion, at block 620. Manufacturability optimization criterion describes one or more optimization parameters and/or targets describing layout 210. For example, optimization criteria can reference a power, processing, area, manufacturability (PPAM) framework, such that the optimization criteria may describe a target that is not simply optimizing for manufacturability or yield on the wafer scale, but rather as part of a multi-parameter optimization. In the context of predicting differentiable manufacturability parameters 225, optimization criteria can be used to assign weights to patch-level manufacturability parameters 225, or to adjust filtering of patch-level manufacturability parameters 225. In this way, design-level manufacturability parameters can reflect manufacturability in a holistic way, accounting for design tradeoffs between different criteria.

At block 625, the computer system generates yield parameter 240 that describes manufacturability of layout 210 using semiconductor manufacturing process 115 constrained by design rules 140. Generating yield parameter 240 can include one or more rules-based models 230 or other algorithms that are configured to determine yield parameter 240. For example, rules-based models 230 can generate a product of the differentiable manufacturability parameters 225 to represent the overall yield value. Additionally or alternatively, block 625 can include filtering, pooling, weighting, or other techniques to holistically generate yield parameter 240 in the context of an optimization framework.

In some embodiments, multiple models 145 can be trained for different manufacturing processes, including but not limited to lithography and chemical mechanical polishing. The yield parameters 240 for individual processes implicated by layout 210 can then be combined for holistic treatment of the entire layout. The overall layout-level yield can also be correlated with the process data 250 describing semiconductor manufacturing system 115 as an approach to improving model training and accuracy. Additionally, yield data can be used to retrain or otherwise adapt trained models 145 to changes in process technology as design rules 140 are updated.

In some embodiments, the computer system optionally generates a wafer scale yield for layout 210 at block 630. Wafer-scale yield differs from yield parameter 240 at least in part in that wafer-scale yield accounts for process-level variability and limitations introduced by physical processes of semiconductor wafer processing systems. Processes such as lithography, deposition and etch, and chemical mechanical polishing, are described by spatial variability across a wafer surface. As such, each semiconductor processing system 115 and subsystem can be simulated, the results of which can be used to determine a yield for a wafer that is manufactured according to layout 210. In some cases, wafer-level yield can be equal to design-level yield-parameter 240. In some cases, wafer-level yield can be less than design-level yield parameter 240, for example, where process model(s) 250 include generating a yield-map that accounts for process variation resulting from non-uniformity of treatments on the wafer-scale. Advantageously, design-level yield and wafer-level yield can improve optimization of layout 210 both for design optimization criteria (e.g., received at block 620 of example process 600) and for semiconductor manufacturing system 115.

In some embodiments, example process 600 includes outputting manufacturability parameters 225 and 240, as well as wafer-scale yield. Outputting operations include, but are not limited to, storing parameter and yield data in data storage, such as databases 125, 135, and/or 165 of FIG. 1. In some embodiments, output operations can be implemented as part of an interactive design environment, whereby a human user of the computer system (e.g., client computing device 110 and/or server(s) 105 of FIG. 1) can be presented with manufacturability/yield data during development of layout 210. This can include an integration of trained model 145 output into a user interface environment used to develop layout 210. For example, outputting manufacturability parameters 225 and yield parameters 240 can include presenting data on a display of a computer system (e.g., client computing device 110 of FIG. 1). In some embodiments, outputting as part of the interactive design environment can include generating user interface data that, when processed by client computing device 110, cause the differentiable manufacturing parameter to be presented on display 111 of client computing device 110 as part of the interactive design environment.

The processes explained above are described in terms of computer software and hardware. The techniques described can constitute machine-executable instructions embodied within a tangible or non-transitory machine (e.g., computer) readable storage medium, that when executed by a machine will cause the machine to perform the operations described. Additionally, the processes can be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for determining manufacturability of an integrated circuit, the method comprising:
   receiving a layout describing the integrated circuit to be manufactured by a semiconductor manufacturing process; and
   generating a differentiable manufacturability parameter as an output of a machine learning model using the layout, the machine learning model being trained to generate the differentiable manufacturability parameter, wherein the differentiable manufacturability parameter represents a continuous and differentiable function that describes the manufacturability of the integrated circuit by the semiconductor manufacturing process.

2. The computer implemented method of claim 1, wherein generating the differentiable manufacturability parameter comprises:
   segmenting the layout to define a patch;
   generating a patch-level manufacturability parameter for the patch using the machine learning model; and
   determining the differentiable manufacturability parameter using the patch-level manufacturability parameter.

3. The computer implemented method of claim 2, wherein determining the manufacturability parameter comprises:
   generating a plurality of patch-level manufacturability parameters including the patch-level manufacturability parameter; and
   generating a product of the plurality of patch-level manufacturability parameters.

4. The computer implemented method of claim 2, wherein the machine learning model is a convolutional neural network model, and wherein generating the patch-level manufacturability parameter comprises:
   generating a patch image describing the patch;
   inputting the patch image to the convolutional neural network model; and
   generating the patch-level manufacturability parameter as an output of the convolutional neural network model.

5. The computer implemented method of claim 2, wherein the patch describes a physical region of the integrated circuit.

6. The computer implemented method of claim 2, wherein the patch describes a physical implementation of a logical function described by the layout and implemented by the integrated circuit.

7. The computer implemented method of claim 1, further comprising training the machine learning model, the training comprising:
   generating a training set of labeled data using a plurality of compliant and non-compliant designs, an entry of the training set comprising a training patch and a manufacturability label;
   generating a training image of the training patch;
   inputting the training image to the machine learning model;
   generating a predicted manufacturability parameter as an output of the machine learning model;
   generating a training signal using the predicted manufacturability parameter and the manufacturability label; and
   modifying one or more learned parameters of the machine learning model using the training signal.

8. The computer implemented method of claim 7, further comprising:
   generating a simulated manufacturability parameter for the training patch using a process model describing one or more constituent processes of the semiconductor manufacturing system, wherein generating the training signal further uses the simulated manufacturability parameter.

9. The computer implemented method of claim 1, further comprising:
   receiving an optimization criterion; and
   modifying one or more elements of the layout based at least in part on the optimization criterion,
   wherein the optimization criterion describes a target manufacturability value, and wherein an extent of modifying the one or more elements of the layout is determined using a gradient-based optimization method and the differentiable manufacturability parameter.

10. The computer implemented method of claim 9, wherein the optimization criterion is a part of a set of optimization criteria for the integrated circuit layout including a target power value, a target performance value, a target area value, or combinations thereof, the computer-implemented method further comprising:

generating an optimization factor describing the performance of the layout against the set of optimization criteria, wherein the extent of modifying the one or more elements of the layout is determined using the optimization factor.

11. The computer implemented method of claim 1, further comprising:
determining a wafer-scale yield of the semiconductor manufacturing process using the differentiable manufacturability parameter.

12. The computer implemented method of claim 11, wherein determining the wafer-scale yield comprises:
generating a map of wafer-scale variation of manufacturability using a process model provided with process data describing one or more constituent processes of semiconductor manufacturing process; and
determining the wafer-scale yield using the map of waver-scale variation, wherein the variation described a deviation of manufacturability as a function of position on a surface of a wafer.

13. At least one machine-accessible storage medium that provides instructions that, when executed by a machine, will cause the machine to perform operations comprising:
receiving a layout describing an integrated circuit to be manufactured by a semiconductor manufacturing process; and
generating a differentiable manufacturability parameter as an output of a machine learning model using the layout, the machine learning model being trained to generate the differentiable manufacturability parameter, wherein the differentiable manufacturability parameter represents a continuous and differentiable function that describes the manufacturability of the integrated circuit by the semiconductor manufacturing process.

14. The machine-accessible storage medium of claim 13, wherein generating the differentiable manufacturability parameter comprises:
segmenting the layout to define a patch;
generating a patch-level manufacturability parameter for the patch using the machine learning model; and
determining the differentiable manufacturability parameter using the patch-level manufacturability parameter.

15. The machine-accessible storage medium of claim 14, wherein the differentiable manufacturability parameter comprises:
generating a plurality of patch-level manufacturability parameters including the patch-level manufacturability parameter; and
generating a product of the plurality of patch-level manufacturability parameters.

16. The machine-accessible storage medium of claim 15, wherein the machine learning model is a convolutional neural network model, and wherein generating the patch-level manufacturability parameter comprises:
generating a patch image describing the patch;
inputting the patch image to the convolutional neural network model; and
predicting the patch-level manufacturability parameter as an output of the convolutional neural network model.

17. A machine-accessible storage medium that provides instructions that, when executed by a machine, with cause the machine to perform operations comprising:
receiving a layout describing an integrated circuit to be manufactured by a semiconductor manufacturing process;
receiving identifier data with the layout, the identifier data identifying the semiconductor manufacturing process;
generating a differentiable manufacturability parameter as an output of a machine learning model using the layout, the machine learning model being trained to generate the differentiable manufacturability parameter, wherein the differentiable manufacturability parameter describes the manufacturability of the integrated circuit by the semiconductor manufacturing process; and
selecting the machine learning model from a plurality of trained machine learning models in accordance with the identifier data.

18. The machine-accessible storage medium of claim 13, wherein the instructions, when executed by the machine, further cause the machine to perform operations comprising:
determining a wafer-scale yield of the semiconductor manufacturing process using the differentiable manufacturability parameter.

19. The machine-accessible storage medium of claim 18, wherein determining the wafer-scale yield comprises:
generating a map of wafer-scale variation of manufacturability using a process model provided with process data describing one or more constituent processes of semiconductor manufacturing process; and
determining the wafer-scale yield using the map of wafer-scale variation, wherein the variation described a deviation of manufacturability as a function of position on a surface of a wafer.

20. The machine-accessible storage medium of claim 13, wherein the instructions, when executed by the machine, further cause the machine to perform operations comprising:
generating user interface data that, when processed by a client computing device, cause the differentiable manufacturing parameter to be presented on a display of the client computing device; and
communicating the user interface data to the client computing device.

* * * * *